(12) United States Patent
Yonebayashi et al.

(10) Patent No.: US 10,410,594 B2
(45) Date of Patent: Sep. 10, 2019

(54) ACTIVE MATRIX SUBSTRATE, AND DISPLAY DEVICE INCLUDING SAME

(71) Applicant: Sharp Kabushiki Kaisha, Sakai, Osaka (JP)

(72) Inventors: Ryo Yonebayashi, Sakai (JP); Kohhei Tanaka, Sakai (JP); Takeshi Noma, Sakai (JP); Takayuki Nishiyama, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 130 days.

(21) Appl. No.: 15/528,105

(22) PCT Filed: Nov. 19, 2015

(86) PCT No.: PCT/JP2015/082594
§ 371 (c)(1),
(2) Date: May 19, 2017

(87) PCT Pub. No.: WO2016/080500
PCT Pub. Date: May 26, 2016

(65) Prior Publication Data
US 2017/0337887 A1    Nov. 23, 2017

(30) Foreign Application Priority Data

Nov. 21, 2014    (JP) ................................ 2014-236845

(51) Int. Cl.
G09G 3/20      (2006.01)
G09G 3/36      (2006.01)
(Continued)

(52) U.S. Cl.
CPC ..... *G09G 3/3648* (2013.01); *G02F 1/133514* (2013.01); *G02F 1/136286* (2013.01);
(Continued)

(58) Field of Classification Search
CPC combination set(s) only.
See application file for complete search history.

(56) References Cited

U.S. PATENT DOCUMENTS

2002/0011799 A1\*  1/2002  Kimura ................ G09G 3/3233
                                                                315/169.3
2015/0293546 A1   10/2015  Tanaka et al.

FOREIGN PATENT DOCUMENTS

JP    H11-184406 A    7/1999
WO    2014-069529 A1  5/2014

\* cited by examiner

*Primary Examiner* — Van N Chow
(74) *Attorney, Agent, or Firm* — ScienBiziP, P.C.

(57) ABSTRACT

The present invention provides a technique for reducing pixel brightness unevenness in a case where driving circuits for switching gate lines to a selected or non-selected state are provided in pixels. An active matrix substrate includes, in each pixel PIX, a pixel-switching element 10 and a pixel electrode PXB. Further, in the active matrix substrate, a plurality of driving circuits that switch one gate line to a selected or non-selected state are arranged in the pixels, and control lines 16 that supply control signals to the driving circuits are arranged in the pixels. Each driving circuit includes a plurality of switching elements and an internal line netA. At least a part of the driving circuit lines among the control lines 16 connected to the driving circuit, and the internal line netA in the driving circuits, are arranged in the vicinity of the pixel-switching element 10, and potentials thereof do not change at a timing when the gate line 13 connected with the pixel-switching element 10 shifts to the non-selected state.

7 Claims, 40 Drawing Sheets

(51) Int. Cl.
*G02F 1/1335* (2006.01)
*G02F 1/1362* (2006.01)

(52) U.S. Cl.
CPC ................ *G09G 3/20* (2013.01); *G09G 3/36* (2013.01); *G09G 3/3677* (2013.01); *G02F 2201/52* (2013.01); *G09G 2300/0408* (2013.01); *G09G 2310/0281* (2013.01); *G09G 2310/0289* (2013.01); *G09G 2310/08* (2013.01)

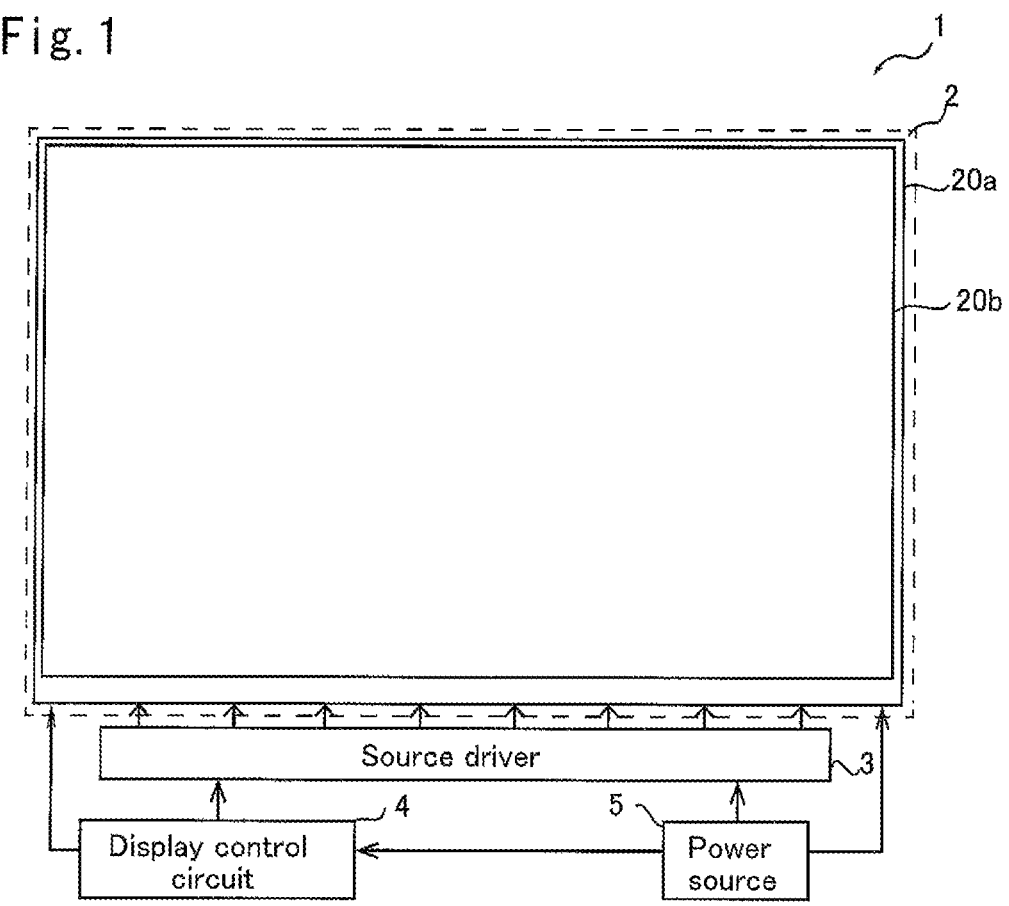

ACTIVE MATRIX SUBSTRATE, AND DISPLAY DEVICE INCLUDING SAME

TECHNICAL FIELD

The present invention relates to an active matrix substrate, and a display device including the same.

BACKGROUND ART

WO 2014/069529 discloses an active matrix substrate in which driving circuits for switching gate lines into a selected state are provided for the gate lines, respectively, in a display region. Each driving circuit includes a plurality of switching elements, and an internal line to which a part of the switching elements are connected. The driving circuit is arranged dispersedly over a plurality of pixels in the vicinity of the gate line corresponding to the driving circuit. Further, on the active matrix substrate, control lines for supplying a control signal to each of the driving circuits is provided. Depending on the control signals supplied, the potential of the internal line in the driving circuit changes, and a voltage signal for causing the gate line to shift to a selected state or a non-selected state is output to the gate line.

SUMMARY OF THE INVENTION

In the configuration disclosed in WO2014/069529, each pixel is provided with a pixel-switching element connected with one gate line and one source line, and a pixel electrode is connected to the drain terminal of the pixel-switching element. At a timing when the gate line is switched from a selected state to a non-selected state, potentials of driving circuit lines such as control lines and internal line provided in the vicinity of the gate lines change, in some cases. In such a case, noise caused by the change of the potential of the driving circuit line is input via a parasitic capacitance between the pixel-switching element connected to the gate line and the driving circuit line, to the pixel electrode connected with the pixel-switching element. As a result, the pixel electrode holds a potential different from a potential that the pixel electrode is supposed to hold, and brightness unevenness occurs between the foregoing pixel and another pixel where no driving circuit line is provided.

It is an object of the present invention to provide a technique for reducing pixel brightness unevenness in a case where driving circuits for switching gate lines to a selected or non-selected state are provided in pixels.

An active matrix substrate according to the present invention has a pixel region that has a plurality of pixels formed in matrix by a plurality of gate lines and a plurality of source lines, and includes, in each pixel, a pixel-switching element connected with one gate line and one source line in the pixel, and a pixel electrode connected to the pixel-switching element. The active matrix substrate further includes: a driving circuit that is arranged in the pixel region, and switches one of the gate lines corresponding thereto to a selected state or a non-selected state, according to a control signal supplied thereto; and a plurality of control lines that are arranged in the pixel region, are connected with the driving circuit, and supply the control signal to the driving circuit, wherein the driving circuit includes a plurality of switching elements and an internal line, and among the control lines connected with the driving circuit, and the internal line in the driving circuit, a first line that is at least a part of the lines arranged in the vicinity of the pixel-switching element, has a potential that does not change at a timing when the gate line connected with the pixel-switching element shifts to the non-selected state.

The configuration of the present invention makes it possible to reduce pixel brightness unevenness in a case where driving circuits for switching gate lines to a selected or non-selected state are provided in pixels.

BRIEF DESCRIPTION OF DRAWINGS

FIG. 1 is a schematic diagram illustrating a schematic configuration of a liquid crystal display device according to Embodiment 1.

MODE FOR CARRYING OUT THE INVENTION

Figure 2A:
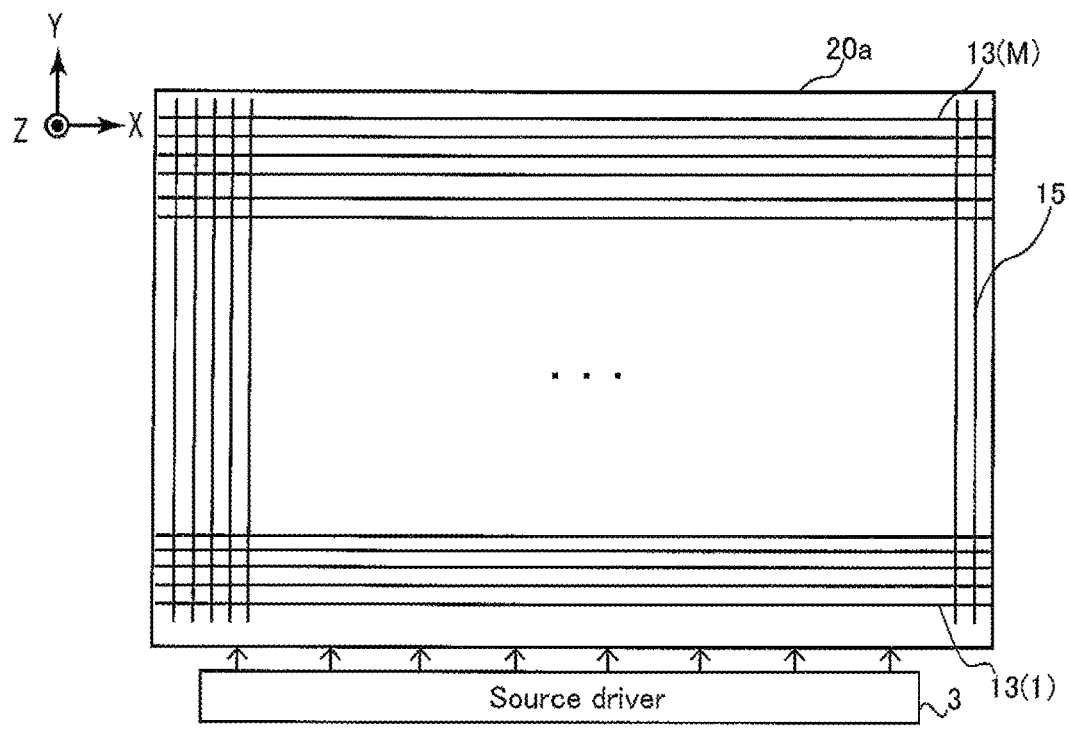
FIG. 2A is a schematic diagram illustrating a schematic configuration of the active matrix substrate illustrated in FIG. 1.

An active matrix substrate according to the present invention has a pixel region that has a plurality of pixels formed in matrix by a plurality of gate lines and a plurality of source lines, and includes, in each pixel, a pixel-switching element connected with one gate line and one source line in the pixel, and a pixel electrode connected to the pixel-switching element. The active matrix substrate further includes: a driving circuit that is arranged in the pixel region, and switches one of the gate lines corresponding thereto to a selected state or a non-selected state, according to a control signal supplied thereto; and a plurality of control lines that are arranged in the pixel region, are connected with the driving circuit, and supply the control signal to the driving circuit, wherein the driving circuit includes a plurality of switching elements and an internal line, and among the control lines connected with the driving circuit, and the internal line in the driving circuit, a first line that is at least a part of the lines arranged in the vicinity of the pixel-switching element, has a potential that does not change at a timing when the gate line connected with the pixel-switching element shifts to the non-selected state (the first configuration).

According to the first configuration, the active matrix substrate has a pixel-switching element and a pixel electrode in each of a plurality of pixels formed in matrix. Further, in the pixel region of the active matrix substrate, a driving circuit that switches one gate line corresponding thereto to a selected state or a non-selected state. Still further, in the pixel region of the active matrix substrate, a plurality of control lines for supplying a plurality of control signals to the driving circuit are provided. The driving circuit includes a plurality of switching elements and an internal line. Among the control lines connected to the driving circuit, and the internal line, a first line that is at least a part of the lines is arranged in the vicinity of the pixel-switching element, and a potential of the first line does not change at a timing when the gate line connected with the pixel-switching element shifts to the non-selected state. Therefore, the pixel electrode connected to the driving switching element via the parasitic capacitance between the first line and the pixel-switching element arranged in the vicinity of the first line is hardly affected by noise caused by a change of the potential of the first line, whereby brightness unevenness hardly occurs between the pixel where the first line is provided and the other pixels.

The second configuration may be the first configuration in which control signals for switching the gate line to the selected state during a predetermined period are supplied to the control lines, respectively, wherein the control signals have phases different from one another, and potentials of the control signals change to a first voltage level, or to a second voltage level that is lower than the first voltage level, and to the first line, a control signal whose potential does not change at a timing when the gate line shifts to the non-selected state is supplied.

With the second configuration, noise caused by a change of the potential of the first line can be prevented from being input to the pixel electrode connected to the pixel-switching element arranged in the vicinity of the first line.

The third configuration may be the first or second configuration in which potentials of the lines other than the first line, among the control lines connected with the driving circuit, and the internal line in the driving circuit, change at a timing when one gate line corresponding to the driving circuit shifts to the non-selected state, the first line is arranged in the vicinity of the pixel-switching element connected to the one gate line, and a second line that is at least a part of the lines other than the first line is arranged in a pixel in a row adjacent to the pixel where the first line is arranged.

According to the third configuration, the potential of the first line with respect to the driving circuit does not change at a timing when the gate line corresponding to the driving circuit shifts to the non-selected state. The first line, therefore, can be arranged in the vicinity of the pixel-switching element connected to the gate line. On the other hand, the second line, whose potential changes at a timing when the one gate line shifts to the non-selected state is arranged in pixels in a row between the gate lines that are different gate lines than the one gate line. With this configuration, the pixel electrode arranged in the vicinity of the second line is not affected by noise caused by a change of the potential of the second line, whereby brightness unevenness can be reduced.

The fourth configuration may be the first or second configuration in which potentials of the lines other than the first line, among the control lines connected with the driving circuit, and the internal line in the driving circuit, change at a timing when one gate line corresponding to the driving circuit shifts to the non-selected state, and a second line that is at least a part of the lines other than the first line is arranged at a position that is approximately a midpoint between the one pixel-switching element connected to the one gate line, and a pixel-switching element adjacent to the foregoing pixel-switching element in a direction in which the gate line extends, so as to be approximately parallel to the source line.

According to the fourth configuration, a parasitic capacitance generated between the second line and the pixel-switching element of the pixel where the second line is provided can be reduced.

The fifth configuration may be any one of the first to third configurations in which potentials of the lines other than the first line, among the control lines connected with the driving circuit, and the internal line, change at a timing when the one gate line corresponding to the driving circuit shifts to the non-selected state; the second line that is at least a part of the lines other than the first line is arranged approximately in parallel with the one gate line in the vicinity of the one gate line; the at least one first line is arranged approximately in parallel with the one gate line, either between the one gate line and the one second line, or at a position overlapping the one second line; and a distance between the one second line and the one first line is smaller than a distance between the pixel-switching element connected to the one gate line and the one first line.

According to the fifth configuration, for the pixel electrodes in the vicinity of the second line, influences of noise caused by a change of the potential of the second line are suppressed by the first line, whereby brightness unevenness can be reduced.

The sixth configuration may be any one of the first to third configurations in which each pixel corresponds to any color among red (R), green (G), and blue (B), and the pixels are arrayed in such a manner that the pixel corresponding to red (R), the pixel corresponding to green (G), and the pixel corresponding to blue (B) are arrayed along the source lines.

According to the sixth configuration, the number of the source lines in the active matrix substrate can be reduced, as compared with a case where the respective pixels corresponding to red (R), green (G), and blue (B) are arranged along the gate line. Thereby, the time required for charging the pixels can be decreased.

A display device according to an embodiment of the present invention includes: any one of the first to sixth active matrix substrates; a counter substrate including a color filter; and a liquid crystal layer interposed between the active matrix substrate and the counter substrate (the seventh configuration).

The following describes embodiments of the present invention in detail, while referring to the drawings. Identical or equivalent parts in the drawings are denoted by the same reference numerals, and the descriptions of the same are not repeated.

<Embodiment 1>
(Configuration of Liquid Crystal Display Device)

FIG. 1 is a schematic diagram illustrating a schematic configuration of a liquid crystal display device according to the present embodiment. The liquid crystal display device 1 includes a display panel 2, a source driver 3, a display control circuit 4, and a power source 5. The display panel 2 includes an active matrix substrate 20a, a counter substrate 20b, and a liquid crystal layer (not shown) interposed between these substrates. Though not shown in FIG. 1, a pair of polarizing plates are provided so that the active matrix substrate 20a and the counter substrate 20b are interposed therebetween. On the counter substrate 20b, there are formed a black matrix (BM), color filters of three colors, which are red (R), green (G), and blue (B), and a common electrode (all are not shown).

As illustrated in FIG. 1, the active matrix substrate 20a is electrically connected with the source driver 3 formed on a flexible substrate. The display control circuit 4 is electrically connected with the display panel 2, the source driver 3, and the power source 5. The display control circuit 4 outputs control signals to the source driver 3, and driving circuits (referred to as gate drivers) provided on the active matrix substrate 20a, which are described below. The power source 5 is electrically connected with the display panel 2, the source driver 3, and the display control circuit 4, and supplies a power source voltage signal to each of the same.

(Configuration of Active Matrix Substrate)

FIG. 2A is a schematic diagram illustrating a schematic configuration of the active matrix substrate 20a. On the active matrix substrate 20a, M (M: natural number) gate lines 13(1) to 13(M) are formed approximately in parallel with one another at uniform intervals from one end to the other end in the X axis direction. Hereinafter, when the gate lines are not distinguished respectively, the gate lines are referred to as "gate lines 13". On the active matrix substrate 20a, a plurality of source lines 15 are formed so as to intersect with each of the gate lines 13. An area surrounded by the gate lines 13 and the source line 15 forms one pixel. Each pixel PIX corresponds to any color of the color filters, and the pixels are arrayed in an order of R, G, and B in the direction in which the gate lines 13 extend.

Figure 2B:
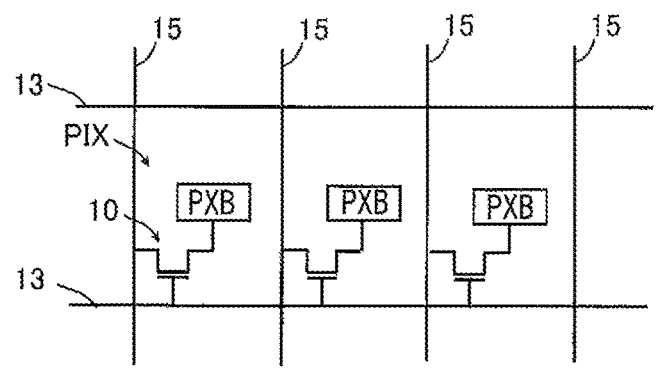
FIG. 2B is a schematic diagram illustrating the pixels illustrated in FIG. 2A, in an enlarged state.

FIG. 2B is a schematic diagram illustrating a part of the pixels on the active matrix substrate 20a, in an enlarged state. As illustrated in FIG. 2B, each pixel PIX includes a thin film transistor (TFT) (hereinafter referred to as a pixel-TFT) 10 composing the pixel PIX, the pixel-TFT 10 being connected with one gate line 13 and one source line 15. The drain electrode of the pixel-TFT 10 is connected with the pixel electrode PXB. When the pixel-TFT 10 is turned on, a data signal voltage is input to the pixel electrode PXB through the source line 15.

Figure 3:
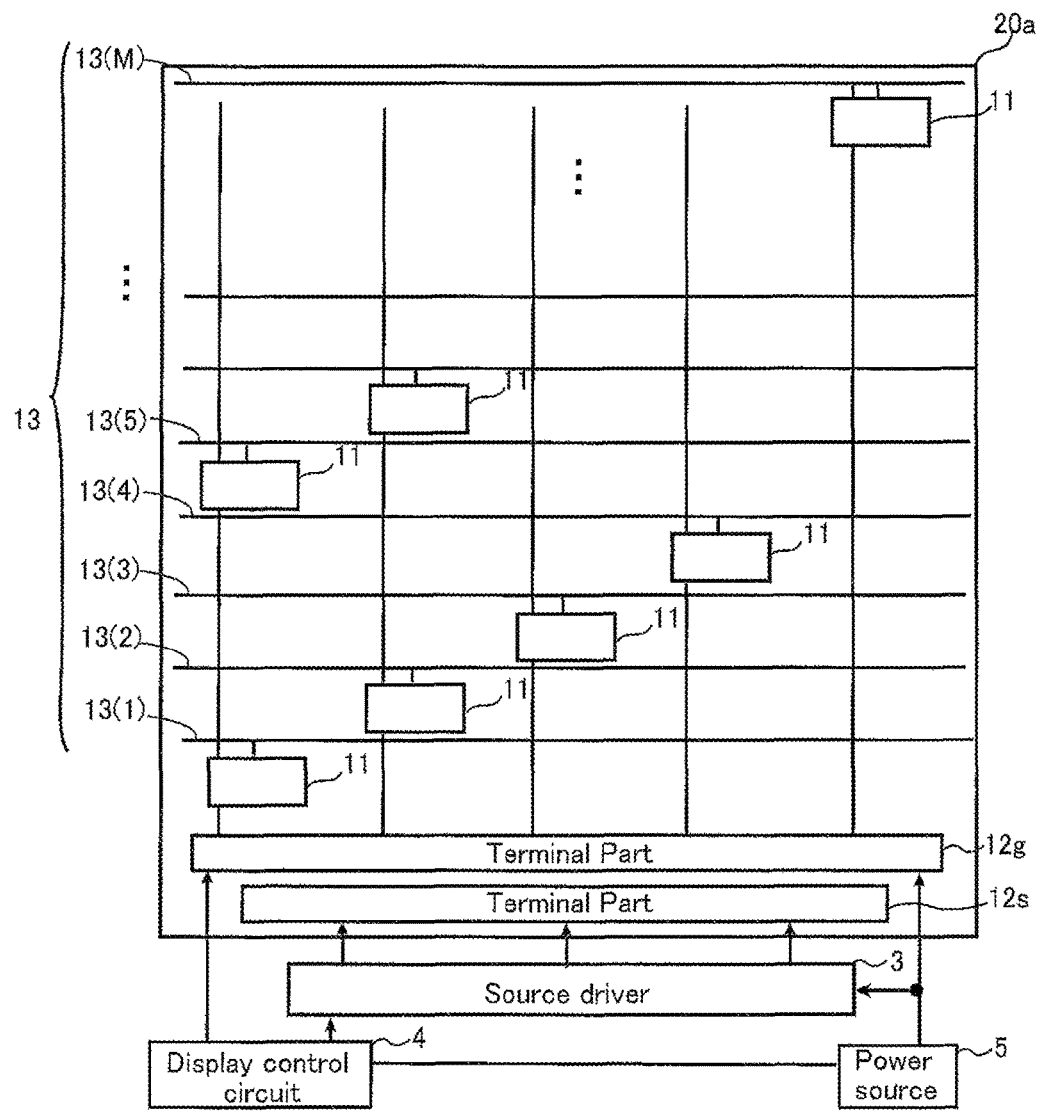
FIG. 3 is a schematic diagram that illustrates a schematic configuration of the active matrix substrate illustrated in FIG. 1 and respective parts connected with the active matrix substrate.

FIG. 3 is a schematic diagram that illustrates a schematic configuration of the active matrix substrate 20a and respective parts connected with the active matrix substrate 20a. In FIG. 3, for convenience sake, the illustration of the source line 15 is omitted. As illustrated in the example in FIG. 3, one gate driver 11 is connected to each gate line 13. Each gate driver 11, connected with one gate line 13, is connected with the gate driver 11 connected to the gate line 13 that is fourth from the one gate line 13, via a control line 16. The control lines 16 are formed in the same layer as the source lines 15 (see FIGS. 2A and 2B) in the active matrix substrate 20a.

In this diagram, for convenience sake, the gate driver 11 is arranged in one row between the gate line 13 and the gate line 13, but actually, as will be described below, the gate driver 11 is arranged in a plurality of rows. Further, in this example, one gate driver 11 is provided for each gate line 13, but a plurality of the gate drivers 11 may be provided for each gate line 13.

In the active matrix substrate 20a illustrated in FIG. 3, in a frame region on a side where the source driver 3 is provided, terminal parts 12g, 12s are provided. The terminal part 12g is connected with the display control circuit 4 and the power source 5. Further, the terminal part 12s is connected with the display control circuit 4, the source driver 3, and the source lines 15 (see FIG. 2).

The display control circuit 4 supplies control signals to the terminal part 12g, the control signals including four clock signals CK1 to CK4 to be described below, and one reset signal CLR. The power source 5 supplies a power source voltage signal to the source driver 3 and the terminal part 12g. The terminal part 12g receives various types of signals supplied thereto, such as the control signals and the power source voltage signal, and supplies the various types of signals to each gate driver 11 via the control lines 16. The gate driver 11 outputs a voltage signal indicating either a selected state or a non-selected state, according to the supplied signals, to the gate line 13 to which the gate driver 11 is connected. In the description below, the state in which the gate line 13 is selected is referred as "the driving of the gate line 13". The source driver 3 outputs data signals to each source line 15 (see FIG. 2), according to the signals input from the display control circuit 4, through the terminal part 12s.

Figure 4:
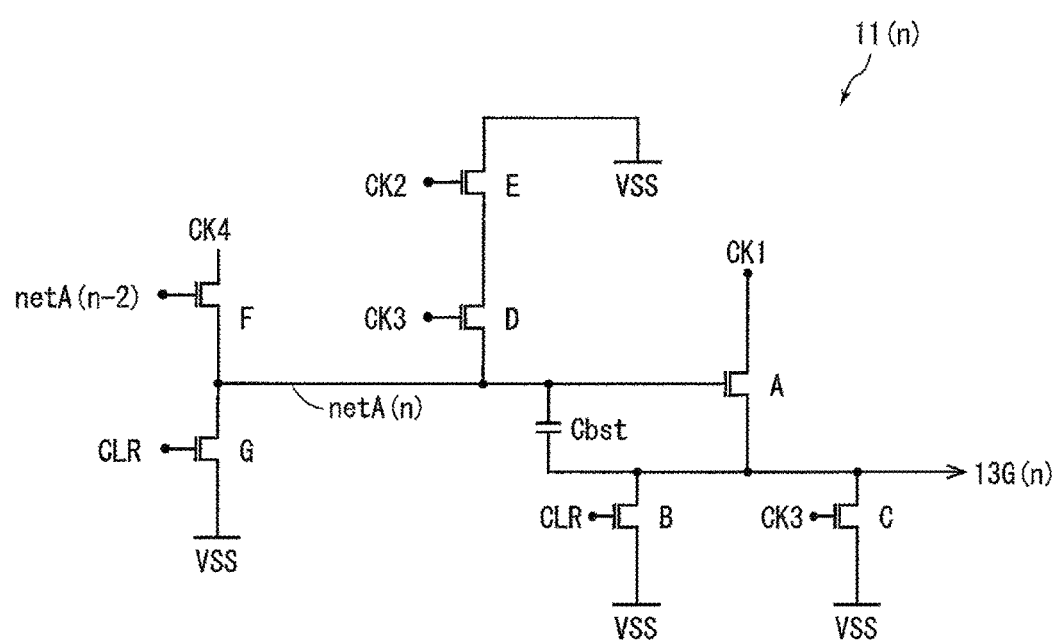
FIG. 4 illustrates an exemplary equivalent circuit of the gate driver illustrated in FIG. 3.

Next, the following description describes the configuration of the gate driver 11. FIG. 4 illustrates an exemplary equivalent circuit of the gate driver 11(n) connected to the gate line 13(n). Here, n=4m+1, where m is an integer equal to or greater than 0. The gate driver 11(n) is a gate driver that drives each of the gate lines 13(1), (5), (9), (13) . . . (n).

As illustrated in FIG. 4, the gate driver 11(n) includes seven TFTs denoted by alphabetic characters A to G (hereinafter referred to as "TFT-A" to "TFT-G"), and one capacitor Cbst.

The gate driver 11(n) includes netA(n), which is an internal line to which a source terminal of TFT-F, drain terminals of TFT-G and TFT-D, a gate terminal of TFT-A, and one of electrodes of the capacitor Cbst are connected. NetA(n) is formed in the same layer as that of the gate lines 13 and the source lines 15 in the active matrix substrate 20a.

Regarding TFT-G, the drain terminal thereof is connected with netA(n), the reset signal CLR is supplied to the gate terminal thereof, and the power source voltage signal VSS is supplied to the source terminal thereof.

Regarding TFT-F, the gate terminal thereof is connected with the gate driver 11(n−2) connected with the gate line 13(n−2), the source terminal thereof is connected to netA(n), and the clock signal CK4 is supplied to the drain terminal thereof.

Regarding TFT-D, the clock signal CK3 is supplied to the gate terminal thereof, the drain terminal thereof is connected to netA(n), and the source terminal thereof is connected to the drain terminal of TFT-E.

Regarding TFT-E, the clock signal CK2 is supplied to the gate terminal thereof, the drain terminal thereof is connected with the source terminal of TFT-D, and the power source voltage signal VSS is supplied to the source terminal thereof.

Regarding TFT-A, the gate terminal thereof is connected to netA(n), a clock signal CK1 is supplied to the drain terminal thereof, and the source terminal is connected to the gate line 13(n).

Regarding the capacitor Cbst, one of electrodes thereof is connected with netA(n), and the other electrode thereof is connected with the gate line 13(n).

Regarding TFT-B, the reset signal CLR is supplied to the gate terminal thereof, the drain terminal thereof is connected with the gate line 13(n), and the power source voltage signal VSS is supplied to the source terminal thereof.

Regarding TFT-C, the clock signal CK3 is supplied to the gate terminal thereof, the drain terminal thereof is connected with the gate line 13(n), and the power source voltage signal VSS is supplied to the source terminal thereof.

To the gate terminal of TFT-F of the gate driver 11(1), a gate startpulse signal is supplied from the display control circuit 4.

Figure 5:
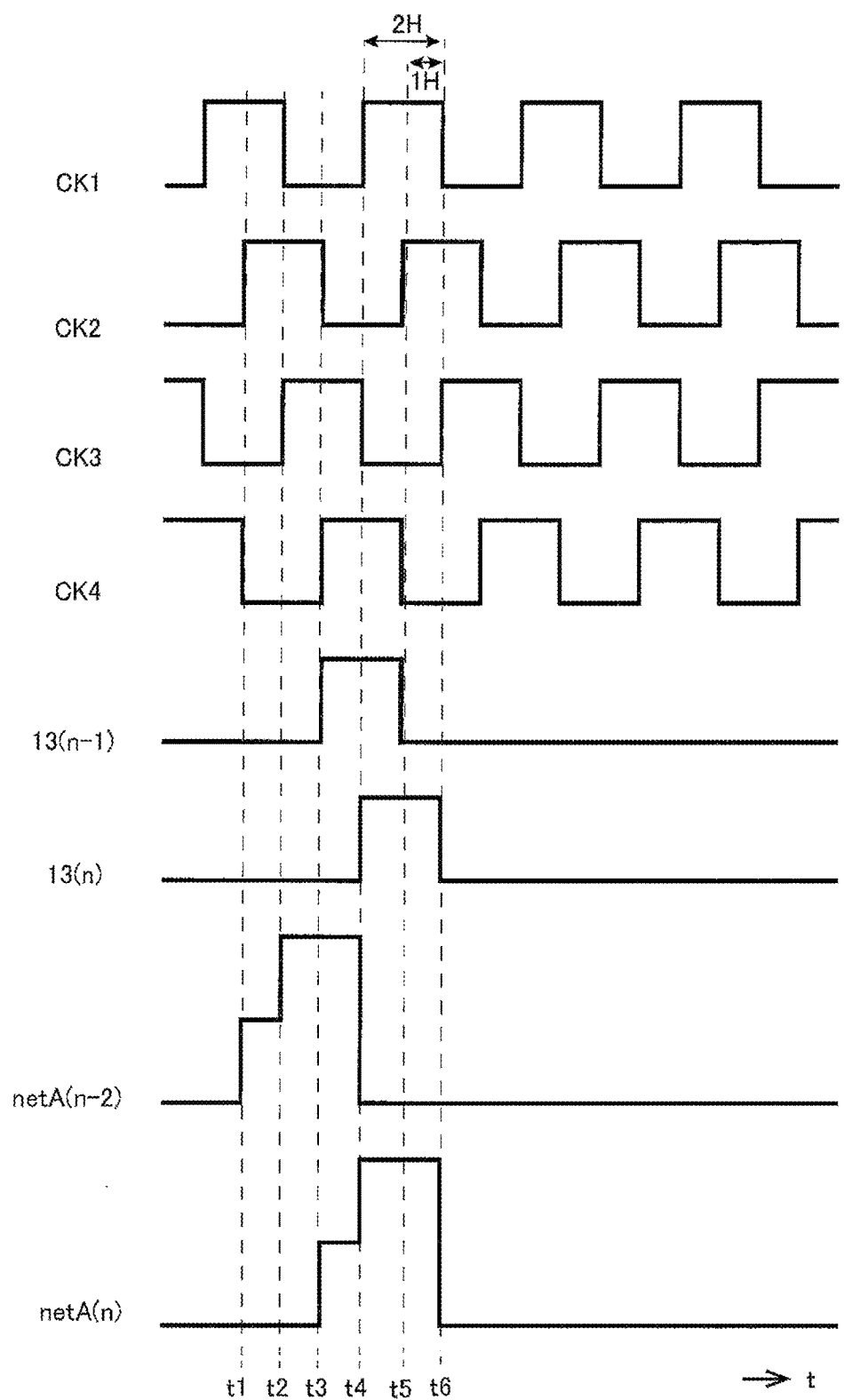
FIG. 5 is a timing chart when the gate driver illustrated in FIG. 4 drives the gate line.

FIG. 5 is a timing chart when the clock signals CK1 to CK4 and the gate driver 11(n) drive the gate line 13(n).

As illustrated in FIG. 5, the clock signals CK1 to CK4 are signals having the following characteristics: the phases thereof are different; and the potentials thereof rise/fall to the H level/the L level every two horizontal scanning periods (2H). The phases of the clock signals CK1 and CK2 are shifted by ¼ cycle (one horizontal scanning period), so are the phases of the clock signals CK2 and CK3, the phases of the clock signals CK3 and CK4, and the phases of the clock signals CK4 and CK1. Besides, the phases of the clock signals CK1 and CK3 are opposite, and so are the phases of the clock signals CK2 and CK4. In FIG. 5, though the illustration of the reset signal CLR is omitted, the reset signal CLR is a signal that is maintained at the H level for a certain period during every perpendicular scanning period, and is output from the display control circuit 4 every one frame.

As described above, the clock signals CK1 to CK4 are supplied to the gate driver 11(n), but clock signals supplied to the gate drivers 11(n−1) to (n−3), and the gate drivers 11(n+1) to (n+3) are different from those supplied to the gate driver 11(n).

For example, in the case of the gate driver 11(n−1), in place of the clock signals CK1, CK2, CK3, and CK4 in the equivalent circuit illustrated in FIG. 4, the clock signals CK4, CK1, CK2, and CK3 are supplied, respectively. In the case of the gate driver 11(n+1), in place of the clock signals CK1, CK2, CK3, and CK4 in the equivalent circuit illustrated in FIG. 4, the clock signals CK2, CK3, CK4, and CK1 are supplied, respectively. In other words, to each gate driver 11, clock signals that are shifted by ¼ cycle from the clock signals supplied to the gate driver 11 of the previous stage, as well as from the clock signals supplied to the gate driver 11 of the subsequent stage. To the gate terminal of TFT-F of the gate line 13(1), the gate startpulse signal is input, from the display control circuit 4.

Subsequently, the following description describes the operation of the gate driver 11, while referring to FIGS. 4 and 5. At time t1 in FIG. 5, the potential of netA(n−2) in the gate driver 11(n−2) rises to the H level, and at time t2, further rises to a level further higher than the H level. With this, during a period from time t1 to time t2, TFT-F is turned ON, and the clock signal CK4 having a potential at the L level is supplied to the drain terminal of TFT-F. Further, at time t2, since the clock signals CK2 and CK3 have potentials at the H level, TFTs-C, -D, and -E are turned ON, and netA(n) and the gate line 13(n) maintain potentials at the L level (VSS).

At time t3, since the potential of the clock signal CK3 is at the H level, TFT-D remains in the ON state, but the potential of the clock signal CK2 falls to the L level, whereby TFT-E is turned OFF. Further, since the potential of netA(n−2) is at the H level, TFT-F remains in the ON state, and the clock signal CK4 at the H level supplied to the drain terminal of TFT-F causes the potential at the H level to be input to the netA(n). Here, TFT-A is turned ON, but the potential of the clock signal CK1 is at the L level. Further, since TFT-C is in the ON state, the gate line 13(n) holds a potential at the L level. At this timing, the gate line 13(n−1) is driven by the gate driver 11(n−1).

Subsequently, at time t4, since the potentials of the clock signals CK2, CK3 are at the L level, TFTs-C, -D, -E are in the OFF state. Further, the potential of netA(n−2) falls to the L level, and TFT-F is turned OFF, while TFT-A remains in the ON state. The clock signal CK1 having a potential at the H level is supplied to the drain terminal of TFT-A, and the potential at the H level is input to the gate line 13(n), thereby causing the gate line 13(n) to shift to the selected state. Further, the potential of netA(n) is boosted up by the capacitor Cbst, thereby rising to a level higher than the H level.

At time t5, the potential of the clock signal CK2 rises to the H level, while the potential of the clock signal CK3 remains at the L level. This causes TFT-E to be turned ON, while TFTs-C, -D remain in the OFF state. Further, here, since netA(n) has a potential at a level higher than the H level, TFT-A remains in the ON state. With the clock signal CK1 supplied to the drain terminal of TFT-A, therefore, the gate line 13(n) holds a potential at the H level.

Subsequently, at time t6, since the potentials of the clock signals CK2, CK3 are at the H level, TFTs-C, -D, -E are in the ON state. With the power source voltage signal VSS supplied to the source terminal of TFT-E, therefore, the potential of netA(n) is pulled down to the L level. Further, the power source voltage signal VSS supplied to the source terminal of TFT-C causes the potential of the gate line 13(n) to change to the L level, whereby the gate line 13(n) shifts to the non-selected state.

During a period from time t5 to time t6, the display control circuit 4 supplies data signals that should be written in a pixel in which the pixel-TFT 10 connected to the gate line 13(n) is arranged, through the terminal part 12s to the source line 15. With this, during one frame period, after time t6 when the gate line 13(n) shifts to the non-selected state, a voltage according to the data signal supplied via the pixel-TFT 10 is held by the pixel electrode in the foregoing pixel.

In this way, according to the clock signals CK1 to CK4, the reset signal CLR, and the power source voltage signal supplied through the control lines 16, each gate driver 11 switches one corresponding gate line into the selected state. Then, data signals are supplied from the display control circuit 4 during a period while each gate line 13 is in the selected state, and even after the gate line 13 is switched to the non-selected state, a voltage according to the data signal is held by the pixel electrode of each pixel.

In this example, TFT-A functions as an output buffer that switches the gate line 13(n) into the selected state. In the equivalent circuit illustrated in FIG. 4, TFT-A is illustrated as being one TFT, but preferably the output buffer has a greater channel width since the load thereon is greater as compared with other TFTs. TFT-A therefore may be composed of a plurality of TFTs.

Further, in the example in FIG. 4, TFTs-D, -E, -F, -G connected to netA(n) causes the potential of netA(n) to be pulled down to the L level at a timing when the potential of the gate line 13(n) changes from the H level to the L level (hereinafter this timing at which the potential falls from the H level to the L level is referred to as an "OFF-timing"), so that the potential of netA(n) should not float. For this purpose, each of these TFTs may be composed of a plurality of TFTs, so that netA(n) should be surely caused to have a potential at the L level at the OFF-timing of the gate line 13(n).

(Exemplary Arrangement in Gate Driver)

Figure 6A:
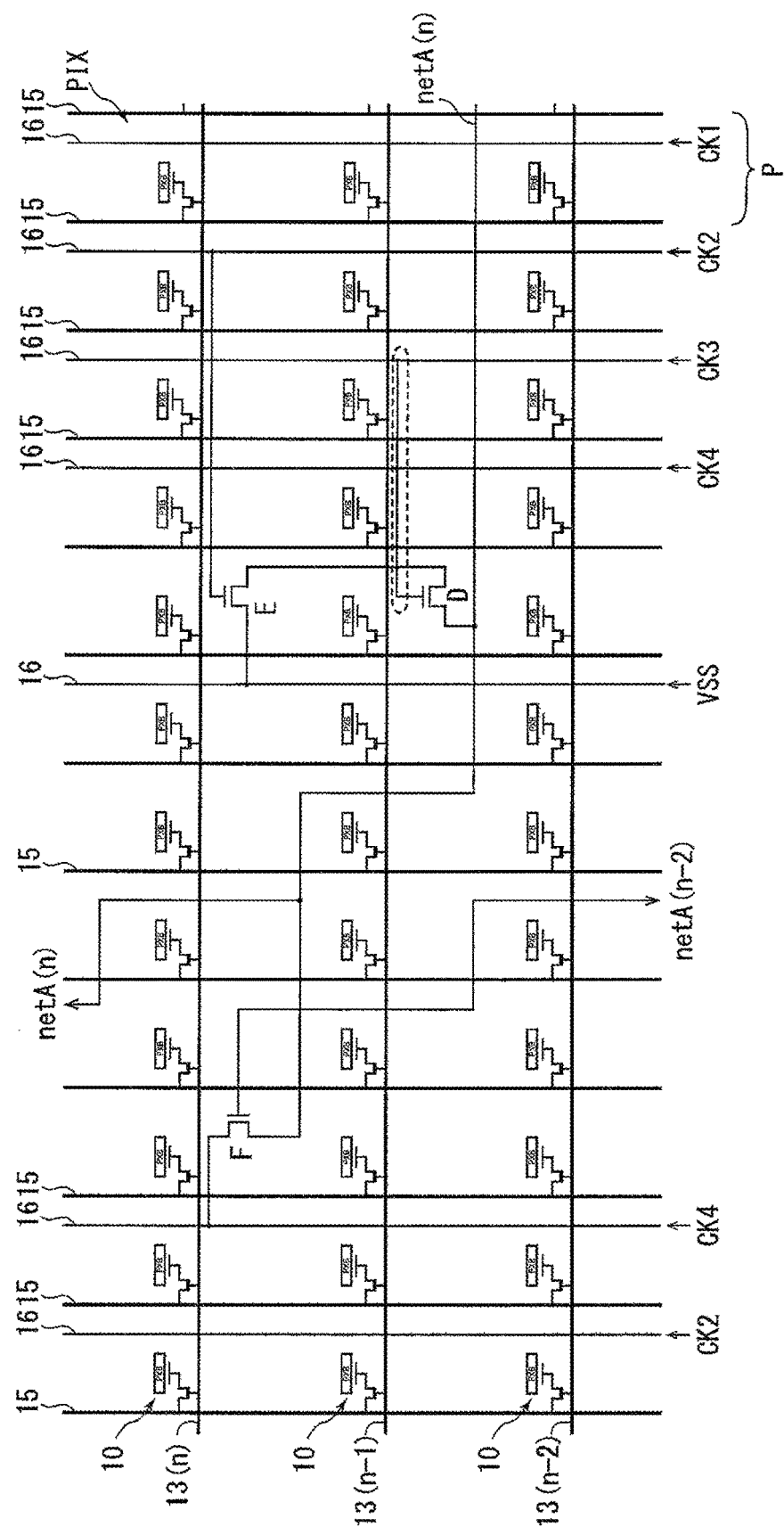
FIG. 6A is a schematic diagram illustrating an exemplary arrangement of the gate drivers illustrated in FIG. 4.
Figure 6B:
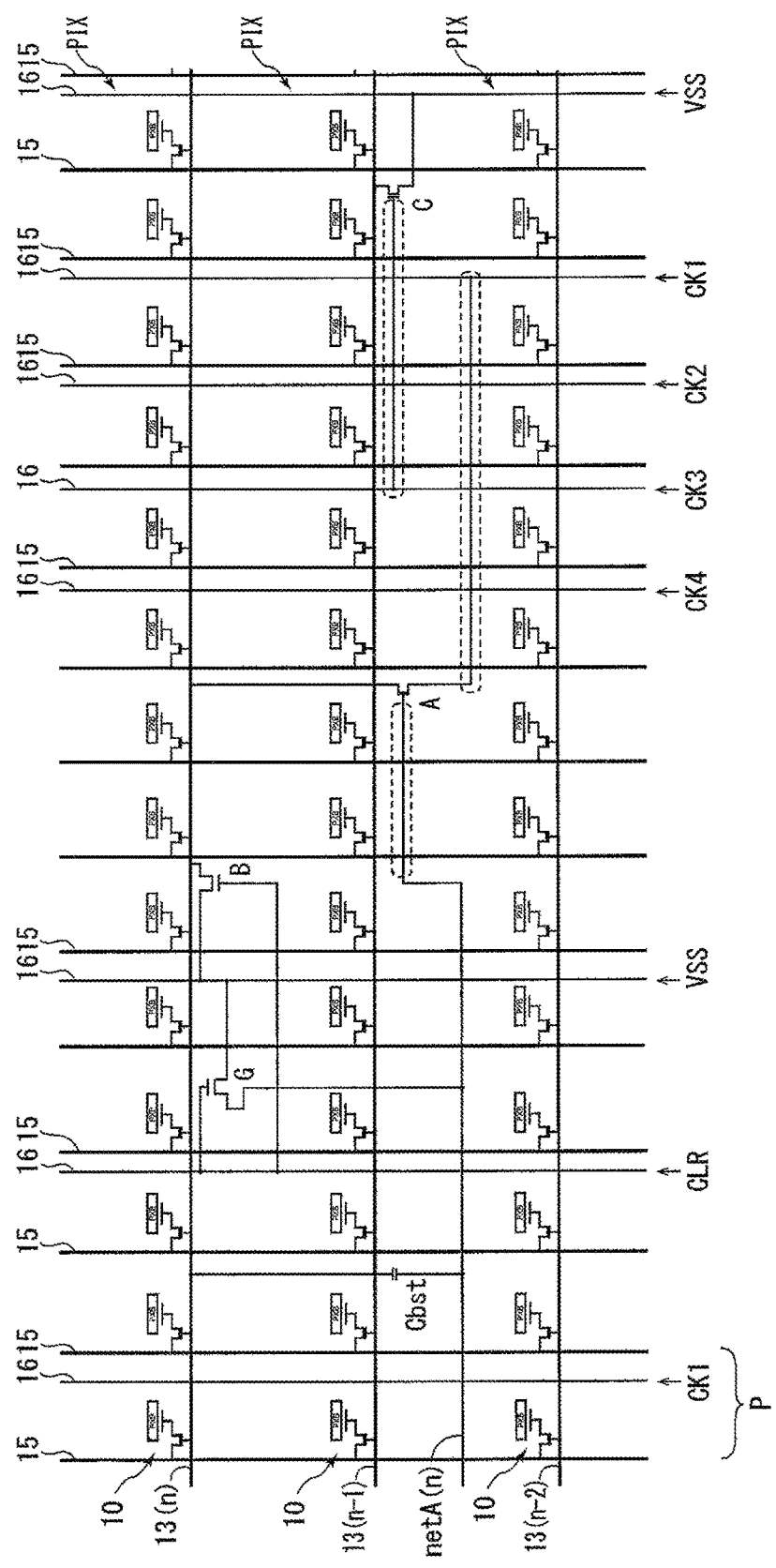
FIG. 6B is a schematic diagram illustrating an exemplary arrangement of the gate drivers illustrated in FIG. 4.

Next, the following description describes an exemplary arrangement of respective elements of the gate driver 11. FIGS. 6A and 6B are schematic diagrams illustrating an arrangement layout of respective elements of the gate driver 11(n). In these diagrams, for convenience sake, the respective alphabetic characters A to G denoting the TFTs-A to -G in the gate driver 11 are shown, and the description of "TFT-" is omitted. Further, FIGS. 6A and 6B are continuous to each other at the column P in each diagram.

As illustrated in FIGS. 6A and 6B, the respective elements composing the gate driver 11(n) are arranged dispersedly in the pixels PIX in two rows, i.e., in a row between the gate line 13(n) and the gate line 13(n−1), and a row between the gate line 13(n−1) and the gate line 13(n−2).

Further, as illustrated in FIGS. 6A and 6B, a plurality of control lines 16 are arranged in a plurality of pixels PIX, the control lines 16 being for supplying the clock signals CK1 to CK4, the reset signal CLR, and the power source voltage signal VSS to the gate driver 11(n) and the other gate drivers 11 (not shown) for driving the other gate lines 13. The control lines 16 extend from the terminal part 12g (see FIG. 3) approximately in parallel to the source lines 15, and are arranged to the pixels where the TFTs of the gate drivers 11 to which the clock signals CK1 to CK4, the reset signal CLR, and the power source voltage signal are supplied are arranged. More specifically, for example, in FIG. 6A, the control line 16 that supplies the clock signal CK2 extends approximately in parallel with the source lines 15, and is arranged approximately in parallel with the gate line 13, from a position in the vicinity of the gate line 13(n) to the pixel where TFT-E is arranged. Likewise, in FIG. 6B, the control line 16 that supplies the clock signal CK1 extends approximately in parallel with the source lines 15, and is arranged approximately in parallel with the gate line 13, from a position between the gate lines 13(n−1) and 13(n−2) to the pixel where TFT-C is arranged.

Further, as illustrated in FIGS. 6A and 6B, netA(n) is arranged in the columns of the pixels PIX where TFTs-F, -E, -D, -G, and -A, as well as the capacitor Cbst are arranged.

In a case where a driving circuit line such as the control line 16 or netA(n) arranged approximately in parallel with the gate line 13(n) is formed in the vicinity of the gate line 13(n), a parasitic capacitance is generated between the pixel-TFT 10 connected to the gate line 13(n) and the driving circuit line. In a case where the potential of the driving circuit line changes at the OFF-timing of the gate line 13(n), therefore, noise caused by the change of the potential of the driving circuit line is input to the pixel electrode PXB connected with the pixel-TFT 10, through the parasitic capacitances between pixel-TFTs 10 and the driving circuit lines.

Figure 7:
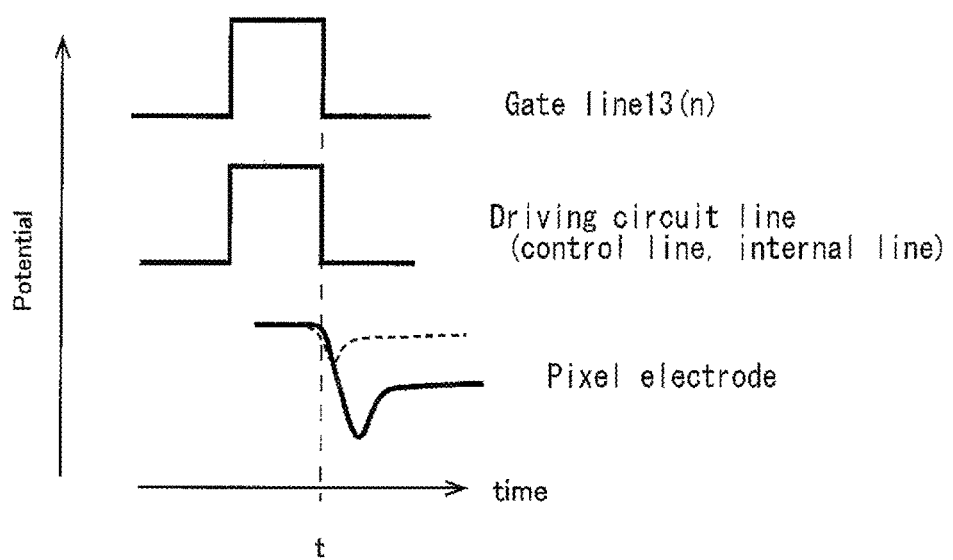
FIG. 7 is a schematic diagram illustrating exemplary changes of potentials of a driving circuit line and a pixel electrode at an OFF-timing of the gate line.

In other words, a pixel electrode arranged in the vicinity of the driving circuit line whose potential changes at the OFF-timing of the gate line 13 is affected by, for example, noise of the driving circuit line whose potential changes to the L level simultaneously at the OFF-timing of the gate line 13, as illustrated in FIG. 7. As a result, after the OFF-timing of the gate line 13, the pixel electrode holds a potential lower than a potential that the pixel electrode is supposed to hold, which is indicated by the broken line, and brightness unevenness occurs. Likewise, in a case where the potential of the driving circuit line changes from the L level to the H level at the OFF-timing of the gate line 13, the pixel electrodes in the vicinity of the driving circuit line are affected by noise caused by the change of the potential of the driving circuit line, and consequently hold potentials different from the potentials supposed to be held, which results in the occurrence of brightness unevenness.

In the present embodiment, as illustrated in FIG. 5, the potentials of the clock signals CK1 and CK3 as well as netA(n) change at the OFF-timing of the gate line 13(n). More specifically, the potentials of the clock signal CK1 and netA(n) changes from the H level to the L level, and the potential of the clock signal CK3 changes from the L level to the H level, at the OFF-timing of the gate line 13(n). For this reason, for example, in a case where at least a part of the driving circuit lines among the control lines 16 for supplying the clock signals CK1 and CK3 and netA(n) are arranged in the vicinity of the gate line 13(n), as illustrated in FIGS. 8A and 8B, the pixel electrodes PXB connected to the pixel-TFTs 10 in the vicinity of the driving circuit lines are affected by noise caused by the change of the potentials of the driving circuit lines.

Figure 8A:
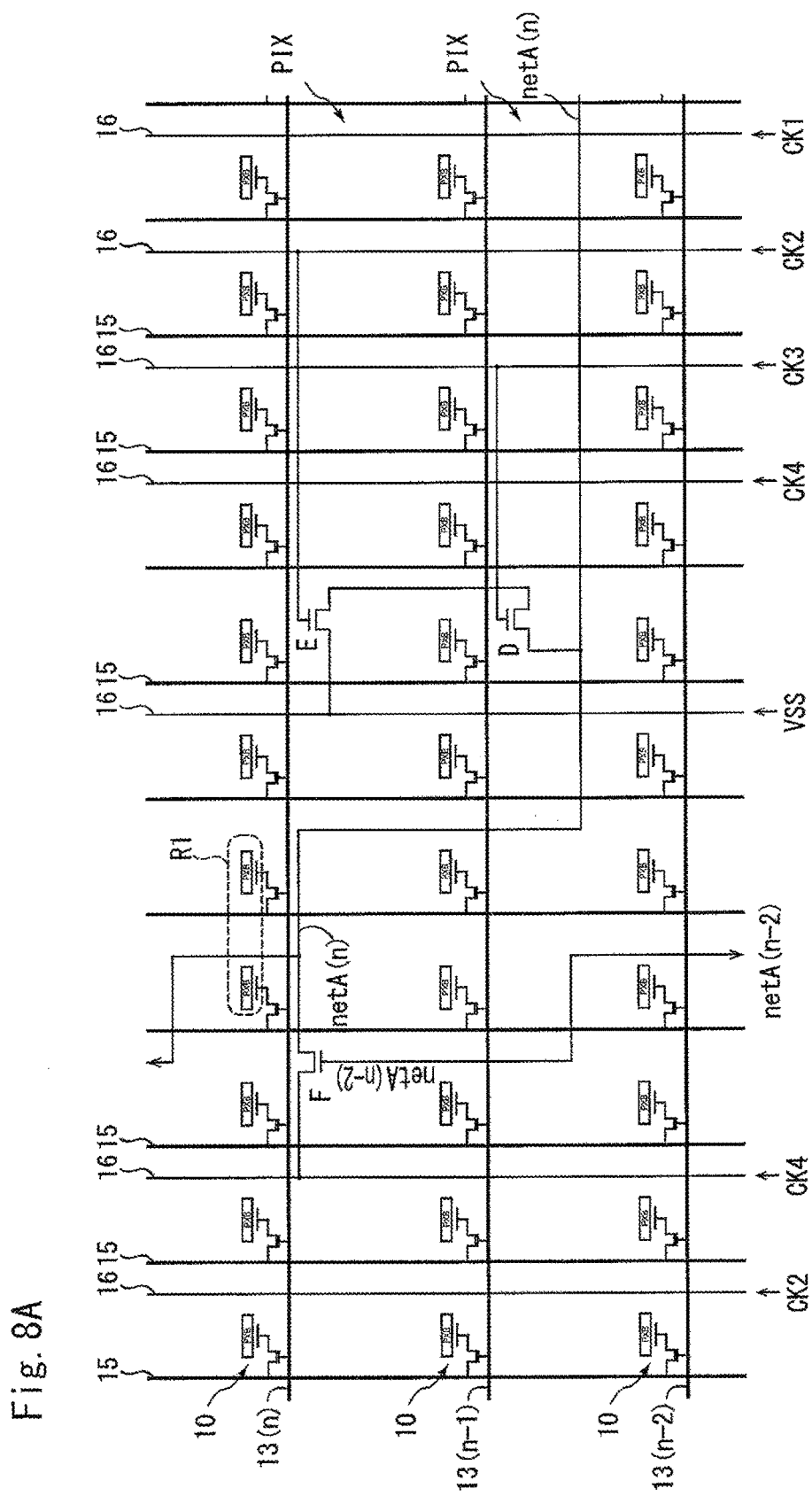
FIG. 8A is a schematic diagram illustrating a comparative example with respect to the exemplary arrangement illustrated in FIG. 6A.
Figure 8B:
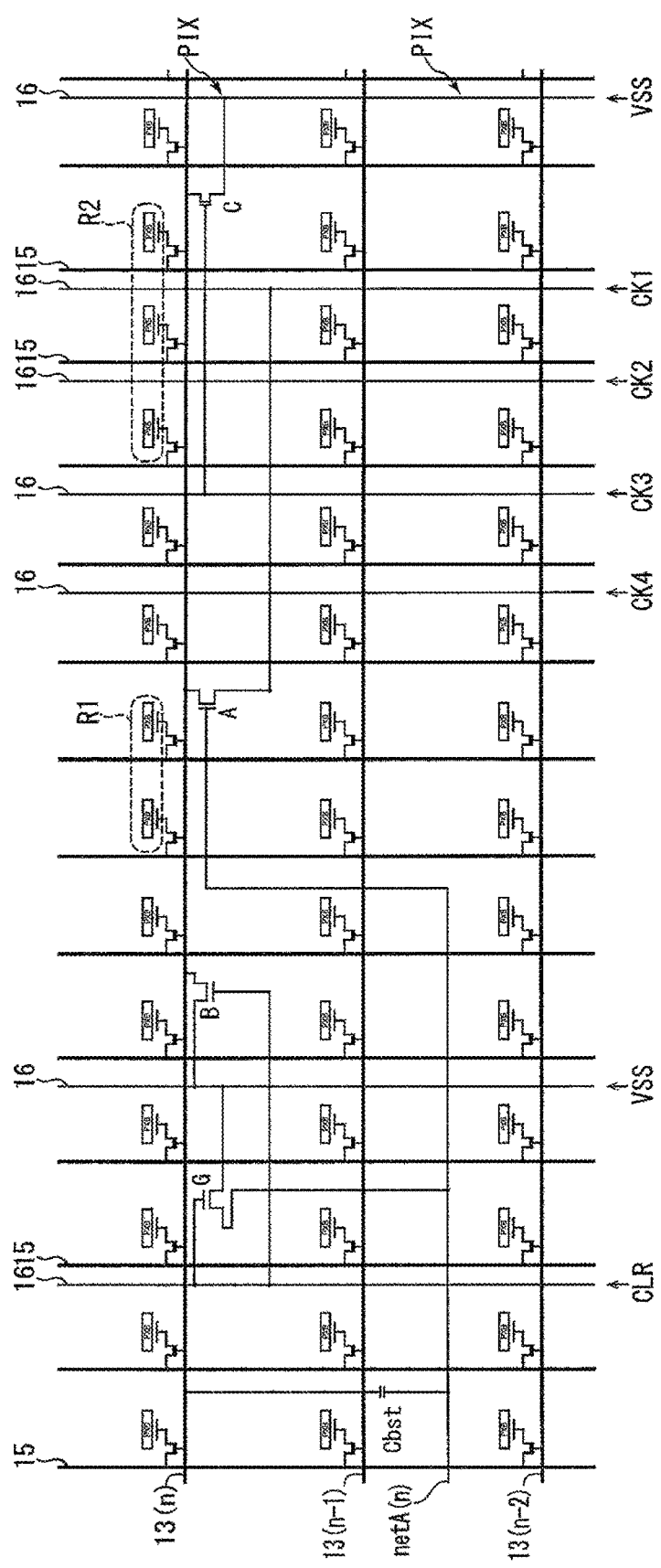
FIG. 8B is a schematic diagram illustrating a comparative example with respect to the exemplary arrangement illustrated in FIG. 6B.

In the layout illustrated in FIGS. 8A and 8B, TFT-F and TFT-A are arranged in the vicinity of the gate line 13(n), and netA(n) approximately in parallel with the gate line 13 are connected to TFT-F and TFT-A. Further, to the drain electrode of TFT-A, the control line 16 that supplies the clock signal CK1 is connected. In the vicinity of netA(n), the pixel electrodes PXB indicated by a broken-line frame R1 are arranged, and these pixel electrodes PXB are affected by noise caused by the change of the potential of netA(n). Since the potential of netA(n) changes from the H level to the L level at the OFF-timing of the gate line 13(n), the pixel electrodes PXB arranged in the vicinity of netA(n) hold potentials lower than the potentials supposed to be held, due to the change of the potential of netA(n).

Further, in the layout illustrated in FIG. 8B, TFT-C is arranged in the vicinity of the gate line 13(n), and the control line 16 supplying the clock signal CK3 is arranged approximately in parallel with the gate line 13, so as to be connected with TFT-C. In this layout, the pixel electrodes PXB, indicated by the broken-line frame R2, are arranged in the vicinity of the control line 16 for supplying the clock signal CK3, arranged approximately parallel with the gate line 13. These pixel electrodes PXB, therefore, are affected by noise caused by the change of the potential of the clock signal CK3. As a result, brightness unevenness occurs between pixels provided with the pixel electrodes PXB indicated by the broken-line frames R1, R2, and the other pixels.

In the present embodiment, the driving circuit lines whose potentials change at the OFF-timing of the gate line 13 are arranged in the row between the gate line 13(n−1) and the gate line 13(n−2), not in the vicinity of the pixel-TFT 10 connected to the gate line 13(n). More specifically, as illustrated by the broken-line frames in FIGS. 6A and 6B, the control line 16 for supplying the clock signal CK3, connected to TFT-D and TFT-C and arranged approximately in parallel with the gate lines 13, is arranged in the row between the gate line 13(n−1) and the gate line 13(n−2). Further, as illustrated in FIGS. 6A and 6B, the netA(n) is arranged in a row between the gate line 13(n−1) and the gate line 13(n−2).

As illustrated in FIG. 5, the potentials of netA(n) and the clock signal CK3 do not change at the OFF-timing of the gate line 13(n−1). Even if the control line 16 supplying the clock signal CK3 is arranged in the vicinity of the gate line 13(n−1), therefore, the pixel electrode PXB arranged in the vicinity of this control line 16 are not affected by the change of the potential of the clock signal CK3.

On the other hand, the potentials of the clock signals CK2 and CK4, the power source voltage signal VSS, and the reset signal CLR do not change at the OFF-timing of the gate line 13(n) (see FIG. 5). As illustrated in FIGS. 6A and 6B, therefore, the control lines 16 for supplying the clock signals CK2 and CK4, the power source voltage signal VSS, and the reset signal CLR are arranged in the vicinity of the pixel-TFT 10 connected to the gate line 13(n).

In other words, any driving circuit line whose potential changes at the OFF-timing of the gate line 13 is not arranged in the vicinity of the pixel-TFT 10 connected to the foregoing gate line 13. It should be noted that "the vicinity of the pixel-TFT 10" refers to a position at which a parasitic capacitance that would be a noise source is generated between the driving circuit line and the pixel-TFT 10: for example, a position in an area where the pixel-TFT 10 is covered by the black matrix (BM) provided on the counter substrate 20b; or, between pixel-TFTs 10 of two adjacent pixels, a position closer to one of the pixel-TFTs 10 relative to an approximate midpoint therebetween.

In Embodiment 1 described above, the driving circuit line that is arranged approximately in parallel with the gate line 13 and whose potential changes at the OFF-timing of the gate line 13 is not arranged in the vicinity of the pixel-TFT 10 connected to the foregoing gate line 13, that is, at such a position that a parasitic capacitance is generated between the driving circuit line and the pixel-TFT 10. In other words, the potential of the driving circuit line arranged in the vicinity of the pixel-TFT 10 does not change at the OFF-timing of the gate line 13 connected to the pixel-TFT 10. This allows the pixel electrode PXB connected with the pixel-TFT 10 to hold a voltage according to a data signal, whereby brightness unevenness caused by the change of the potential of the driving circuit line can be reduced.

<Embodiment 2>

Figure 9A:
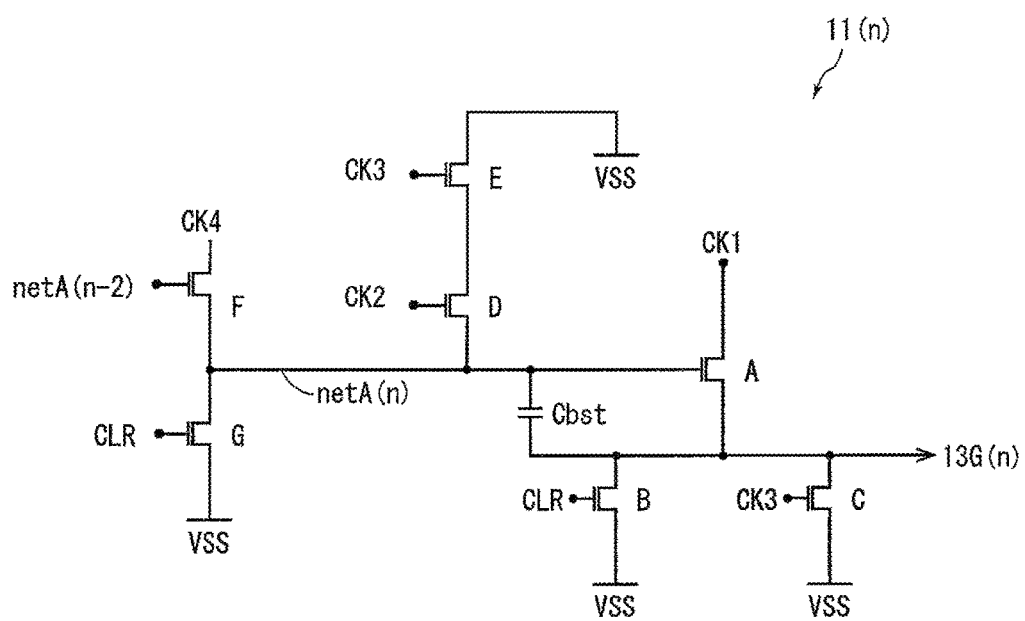
FIG. 9A illustrates an exemplary equivalent circuit of a gate driver in Embodiment 2.

FIG. 9A illustrates an equivalent circuit of a gate driver 11(n) in the present embodiment. The gate driver 11(n) illustrated in FIG. 9A is composed of the same elements as those of the gate driver 11(n) illustrated in FIG. 4 according to Embodiment 1, but the clock signals supplied to the gate terminals of TFTs-D and -E are different from those in Embodiment 1. More specifically, as illustrated in FIG. 9A, in the present embodiment, the clock signal CK2 is supplied to the gate terminal of TFT-D, and the clock signal CK3 is supplied to the gate terminal of TFT-E.

Figure 9B:
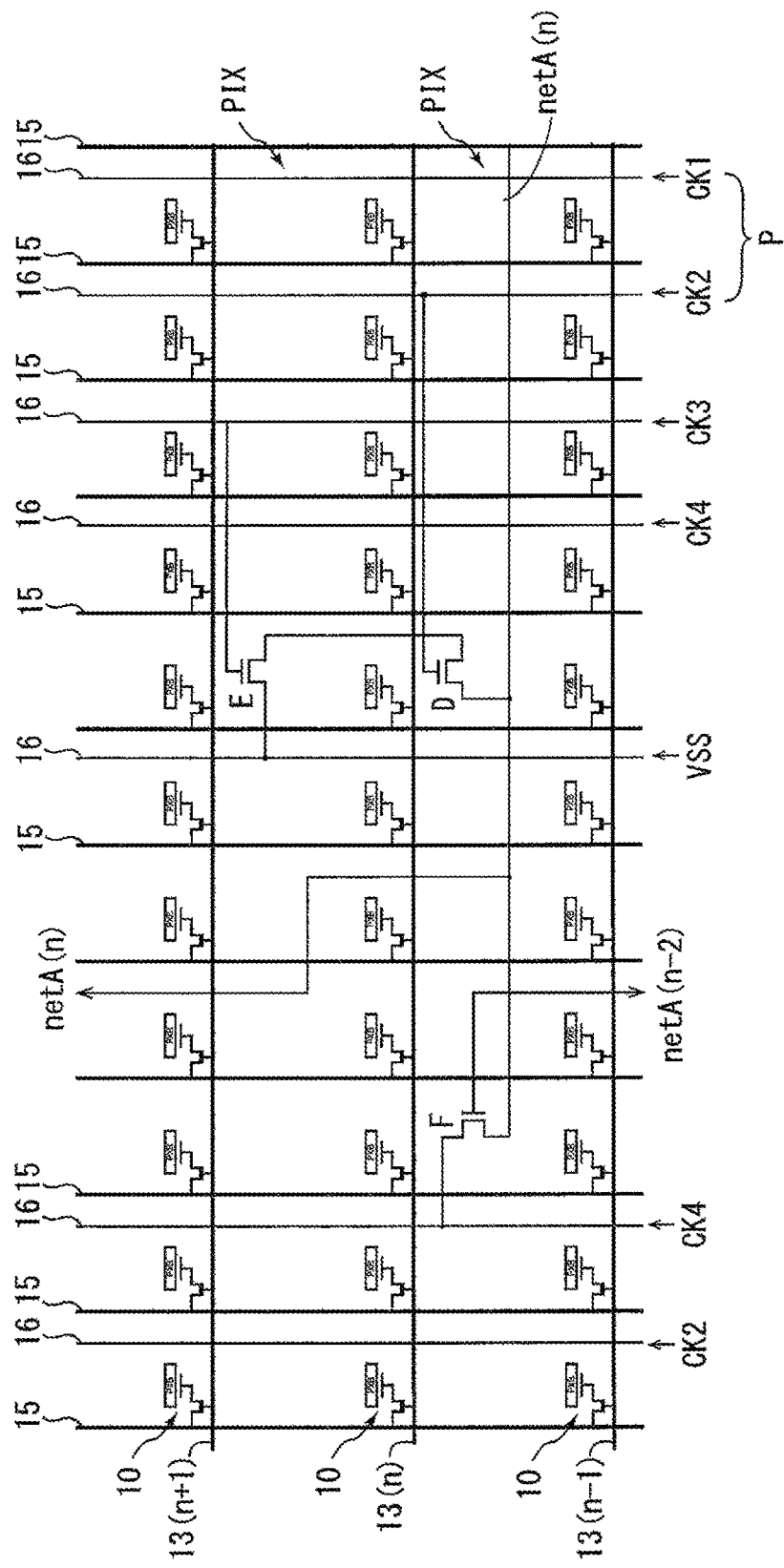
FIG. 9B is a schematic diagram illustrating an exemplary arrangement of the gate driver illustrated in FIG. 9A.
Figure 9C:
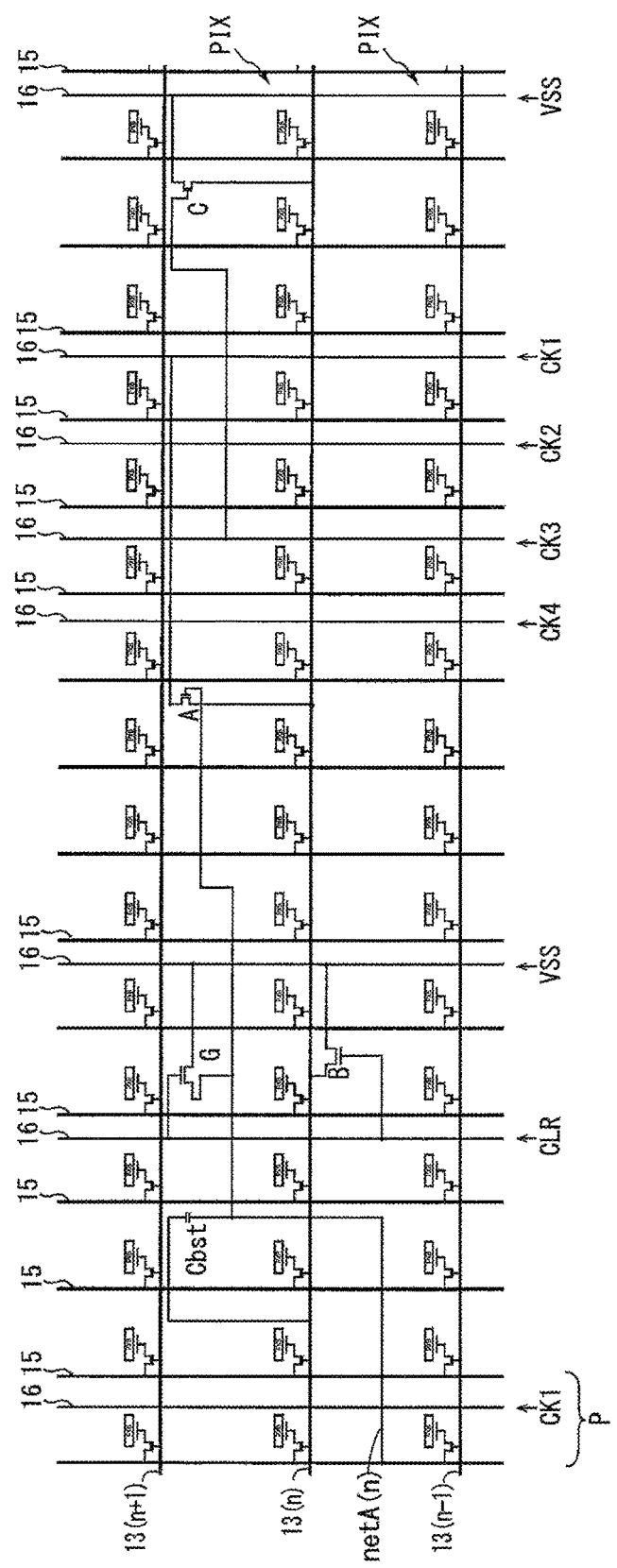
FIG. 9C is a schematic diagram illustrating an exemplary arrangement of the gate driver illustrated in FIG. 9A.

FIGS. 9B and 9C are schematic diagrams illustrating an exemplary arrangement layout of the gate driver 11(n) illustrated in FIG. 9A. FIGS. 9B and 9C are continuous to each other at the column P illustrated therein.

In Embodiment 1 described above, the respective elements composing the gate driver 11(n) are arranged in the pixels in two rows arranged from the gate line 13(n) toward the terminal part 12g (see FIG. 3) (in a row between the gate line 13(n) and the gate line 13(n−1), and a row between the gate line 13(n−1) and the gate line 13(n−2)). An example described as the present embodiment is, as illustrated in FIGS. 9B and 9C, an example in which the respective elements composing the gate driver 11(n) are arranged in the pixels in two rows between which the gate line 13(n) is interposed (i.e., a row between the gate lines 13(n+1) and 13(n), and a row between the gate lines 13(n) and 13(n−1)).

While TFT-D, TFT-C, and TFT-A are arranged in the pixels between the gate line 13(n−1) and the gate line 13(n−2) in FIG. 6A described above, TFT-D is arranged in the pixel between the gate line 13(n) and the gate line 13(n−1) in the present embodiment, as illustrated in FIGS. 9B and 9C. Further, TFT-C and TFT-A are arranged in the pixels between the gate line 13(n+1) and the gate line 13(n). In FIGS. 9B and 9C, therefore, the control line 16 supplying the clock signal CK3 is arranged approximately in parallel with the gate line 13 to the position of TFT-C, and is connected with TFT-C. Still further, the control line 16 supplying the clock signal CK2 is arranged approximately in parallel with the gate line 13 to the position of TFT-D, and is connected with TFT-D. Still further, the control line 16 supplying the clock signal CK1 is arranged approximately in parallel with the gate line 13 to the position of TFT-A, and is connected with TFT-A.

Further, while netA(n) is arranged over two rows that are a row between the gate line 13(n) and the gate line 13(n−1), and a row between the gate line 13(n−1) and the gate line 13(n−2) in FIG. 6A described above, netA(n) is arranged over two rows that are a row between the gate line 13(n+1) and the gate line 13(n), and a row between the gate line 13(n) and the gate line 13(n−1) in the present embodiment, as illustrated in FIGS. 9B and 9C. NetA(n) is arranged approximately at a position of the midpoint between the pixels in each of these rows.

In the present embodiment as well, any driving circuit line whose potential changes at the OFF-timing of the gate line 13(n) is not arranged in the vicinity of the gate line 13(n), that is, at such a position that a parasitic capacitance is generated between the diving circuit line and the pixel-TFT 10 connected to the foregoing gate line 13(n). This allows the pixel electrode PXB connected with the pixel-TFT 10 connected to the gate line 13(n) to be free from being affected by noise caused by the change of the potential of the driving circuit line.

Further, in both of Embodiments 1 and 2, the respective elements of the gate driver 11 are arranged dispersedly over the pixels of two rows. In Embodiment 1, therefore, an area equivalent to the pixels of two rows are needed in a space from the gate line 13(1) to the terminal part 12g so that the respective elements of the gate driver 11(1) that drives the gate line 13(1) are arranged in the area. On the other hand, in the case of Embodiment 2, since the respective elements of the gate driver 11(1) are arranged in the row between the gate line 13(1) and the gate line 13(2), only an area equivalent to the pixels of one row is needed in a space from the gate line 13(1) to the position of the terminal part 12g (see FIG. 3). In Embodiment 2, therefore, the frame region in which the terminal part 12g (see FIG. 3) is arranged can be reduced in size, as compared with Embodiment 1.

<Embodiment 3>

Described as Embodiment 1 is the configuration of the gate driver 11 using the four clock signals CK1 to CK4, together with the exemplary arrangement of the same. Described as the present embodiment is a configuration of a gate driver using eight clock signals, together with an exemplary arrangement of the same.

Figure 10:
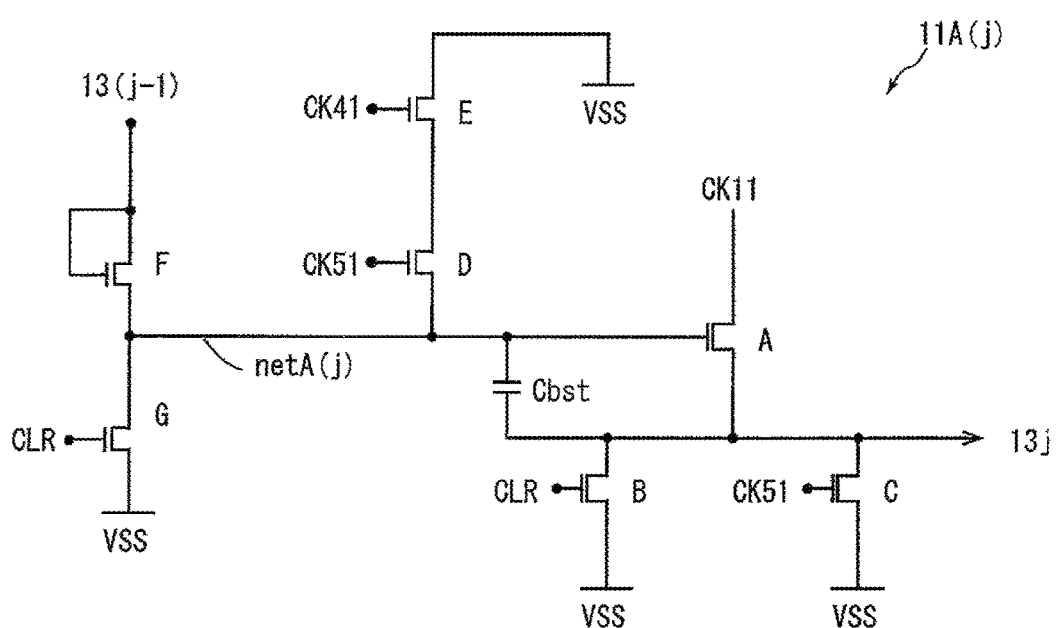
FIG. 10 illustrates an exemplary equivalent circuit of a gate driver in Embodiment 3.

FIG. 10 illustrates an equivalent circuit of a gate driver in the present embodiment. The gate driver 11A(j) illustrated in FIG. 10 is a gate driver that drives the gate line 13(j). Here, j=8m+1, where m represents an integer equal to or greater than 0. In other words, the gate driver 11A(j) is a gate driver that drives each of the gate line 13(1), (9), (17) . . . .

The gate driver 11A(j) includes TFTs-A to -G and a capacitor Cbst, and has an internal line netA(j), as is the case with the gate driver 11(n). The gate drivers 11A driving the gate lines 13 other than the gate line 13(j) have the same configuration except that the clock signals supplied to the gate driver 11A(j) are different. The following describes the gate driver 11A(j), principally about the points different from the gate driver 11(n).

Regarding the gate driver 11A(j), the gate terminal and the drain terminal of TFT-F are connected to the gate line 13(n−1). Besides, a clock signal CK11 is supplied to the drain terminal of TFT-A, a clock signal CK41 is supplied to the gate terminal of TFT-E, and a clock signal CK51 is supplied to the gate terminals of TFT-C and TFT-D.

To the gate terminal and the drain terminal of TFT-F of the gate driver 11A(1), the gate startpulse signal is supplied from the display control circuit 4. Incidentally, the clock signals supplied to the gate driver 11A(j), taken up in this example, are different from those supplied to the gate drivers 11A(j−1) to 11A(j−7), and those supplied to the gate drivers 11A(j+1) to 11A(j+7). Details of the eight clock signals are to be described below.

Figure 11:
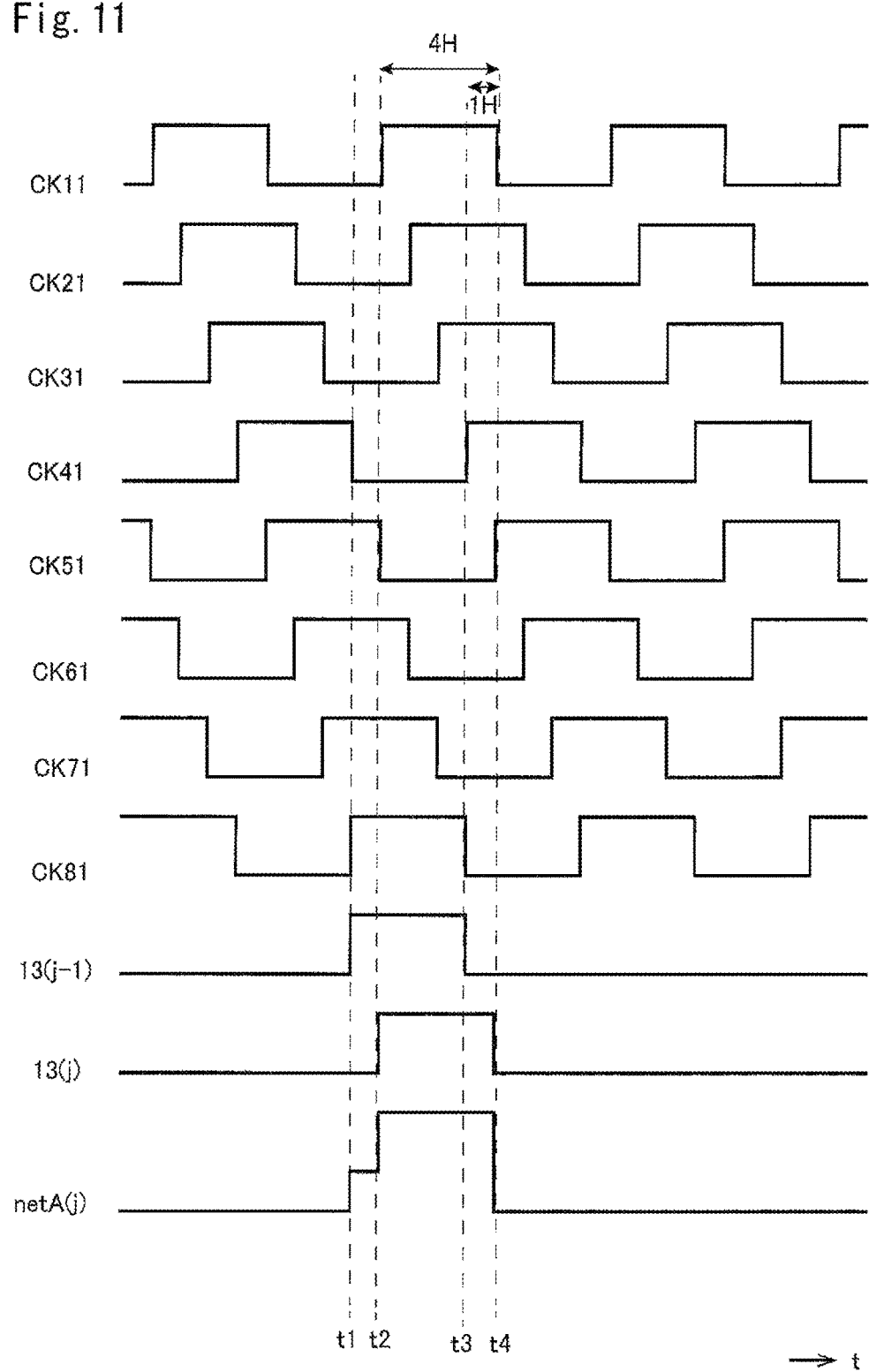
FIG. 11 is a timing chart when the gate driver illustrated in FIG. 10 drives the gate line.

The following description describes the operation of the gate driver 11A(j). FIG. 11 is a timing chart when the gate driver 11A(j) drives the gate line 13(j).

As illustrated in FIG. 11, eight clock signals CK11 to CK81 are signals having the following characteristics: the phases thereof are different; and the potentials thereof rise/fall to the H level/the L level every four horizontal scanning periods (4H). The phases of clock signals that are adjacent in FIG. 11 are shifted by ⅛ cycle (one horizontal scanning period). Besides, the phases of the clock signals CK11 and CK51 are opposite to each other, and so are the phases of the clock signals CK21 and CK61, the phases of the clock signals CK31 and CK71, and the phases of the clock signals CK41 and CK81. In FIG. 11, though the illustration of the reset signal CLR is omitted, the reset signal CLR is a signal that is maintained at the H level for a certain period during every perpendicular scanning period, and is output from the display control circuit 4 every one frame.

Further, in the case of the gate driver 11A(j−1), clock signals CK81, CK31, and CK41 are supplied thereto, in place of the clock signals CK11, CK41, and CK51 in the equivalent circuit illustrated in FIG. 10, respectively. Still further, in the case of the gate driver 11A(j+1), the clock signals CK21, CK51, and CK61 are supplied thereto, in place of the clock signals CK11, CK41, and CK51 in the equivalent circuit illustrated in FIG. 10, respectively. In other words, the clock signals supplied to each gate driver 11A are clock signals that are shifted by ⅛ cycle, as compared with the clock signals supplied to the gate driver 11A of the previous stage and the clock signals supplied to the gate driver 11A of the subsequent stage.

The gate driver 11A(j) is different from the gate driver 11(n) regarding the point that the potential of the gate line 13(j−1) is supplied to TFT-F thereof. Here, the clock signals CK11, CK41, and CK51 supplied to the TFT-A, C, D, and E are clock signals having cycles equal to the doubled cycles of the clock signals CK1, CK2, and CK3 supplied to TFTs-A, -C, -D, and -E of the gate driver 11(n), respectively. The ON/OFF timings of TFTs other than TFT-F in the gate driver 11A(j) are therefore identical to those of the gate driver 11(n).

With reference to FIGS. 10 and 11, the potential of the gate line 13(j−1) is supplied to the TFT-F of the gate driver 11A(j) during a period from t1 to t3 while the potential of the gate line 13(j−1) is at the H level, whereby TFT-F is turned ON. Here, TFT-E is turned off, and therefore, at time t1, netA(j) is precharged to the potential at the H level.

At time t2, since the potentials of the clock signals CK41, CK51 are at the L level, TFTs-D, -E, and -C are in the OFF state. Further, at time t2, TFT-A remains in the ON state, and the clock signal CK11 having a potential at the H level is supplied to the drain terminal of TFT-A, and the potential at the H level is input to the gate line 13(j), thereby causing the gate line 13(j) to shift to the selected state. Further, the potential of netA(j) is boosted up by the capacitor Cbst, thereby rising to a level higher than the H level.

At time t3, the potential of the gate line 13(j−1) falls to the L level, thereby causing TFT-F to be turned OFF. Further, here, since clock signal CK41 has a potential at the H level, TFT-E is turned ON, whereas TFTs-D and -C remain in the OFF state. NetA(j) therefore maintains the potential higher than the H level, and the gate line 13(j) holds the potential at the H level.

At time t4, the potential of the clock signal CK11 falls to the L level, and the potential of the clock signal CK51 rises to the H level. Here, TFT-E remains in the OFF state and TFTs-C and -D are turned ON, which causes the netA(j) and the gate line 13(j) to be pulled down to the potentials at the L level.

In this way, according to the clock signals CK11 to CK81, the reset signal CLR, and power source voltage signal supplied through the control lines 16, each gate driver 11A switches the corresponding gate line 13 to the selected state.

In the present embodiment, as illustrated in FIG. 11, the potentials of netA(j) and the clock signals CK1 land CK51 change at the OFF-timing of the gate line 13(j).

Figure 12A:
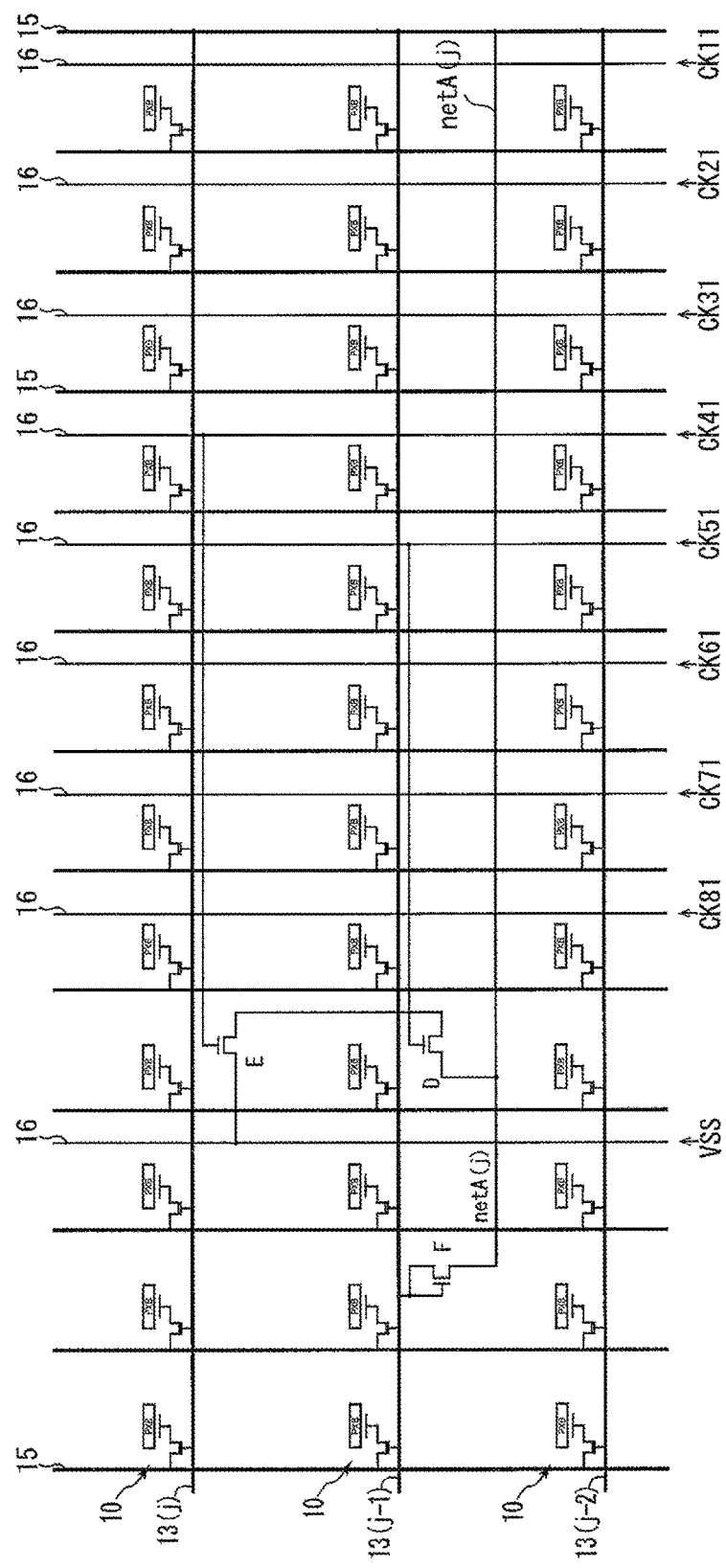
FIG. 12A is a schematic diagram illustrating a comparative example with respect to the exemplary arrangement of the gate driver in Embodiment 3.
Figure 12B:
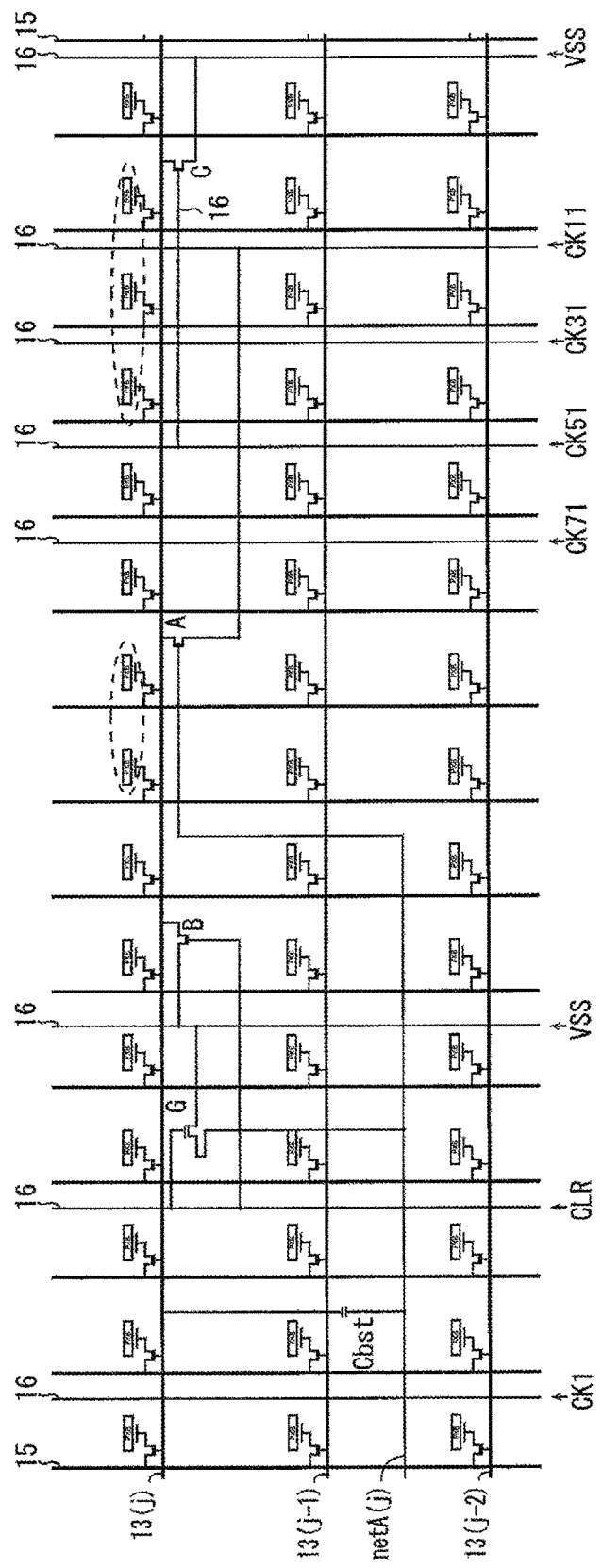
FIG. 12B is a schematic diagram illustrating a comparative example with respect to the exemplary arrangement of the gate driver in Embodiment 3.

Here, FIGS. 12A and 12B illustrate a layout in a case where the pixel electrode PXB is affected by noise caused by the change of the potential of the driving circuit line. As illustrated in FIGS. 12A and 12B, netA(j) and the control line 16 supplying the clock signal CK51 are arranged in the vicinity of the gate line 13(j). In the vicinity of these driving circuit lines, the pixel-TFTs 10 connected to the gate line 13(j) are arranged. The pixel electrodes PXB connected with these pixel-TFTs 10 are affected by noise caused by the change of the potentials of the driving circuit lines, via parasitic capacitances between the pixel-TFTs 10 and the driving circuit lines. In other words, as illustrated in FIG. 12B, the pixel electrodes PXB indicated by broken-line frames, which are arranged in the vicinity of netA(j) or the control line 16 that supplies the clock signal CK51 and are connected to the pixel-TFTs 10, are affected by noise caused by the change of the potentials of netA(j) or the control line 16 that supplies the clock signal CK51.

In the present embodiment, the gate driver 11A(j) is arranged so that the pixel electrodes PXB connected with the pixel-TFTs 10 connected to the gate line 13(j) should not be affected by noise caused by the change of the potentials of netA(j) and the control line 16.

Figure 13A:
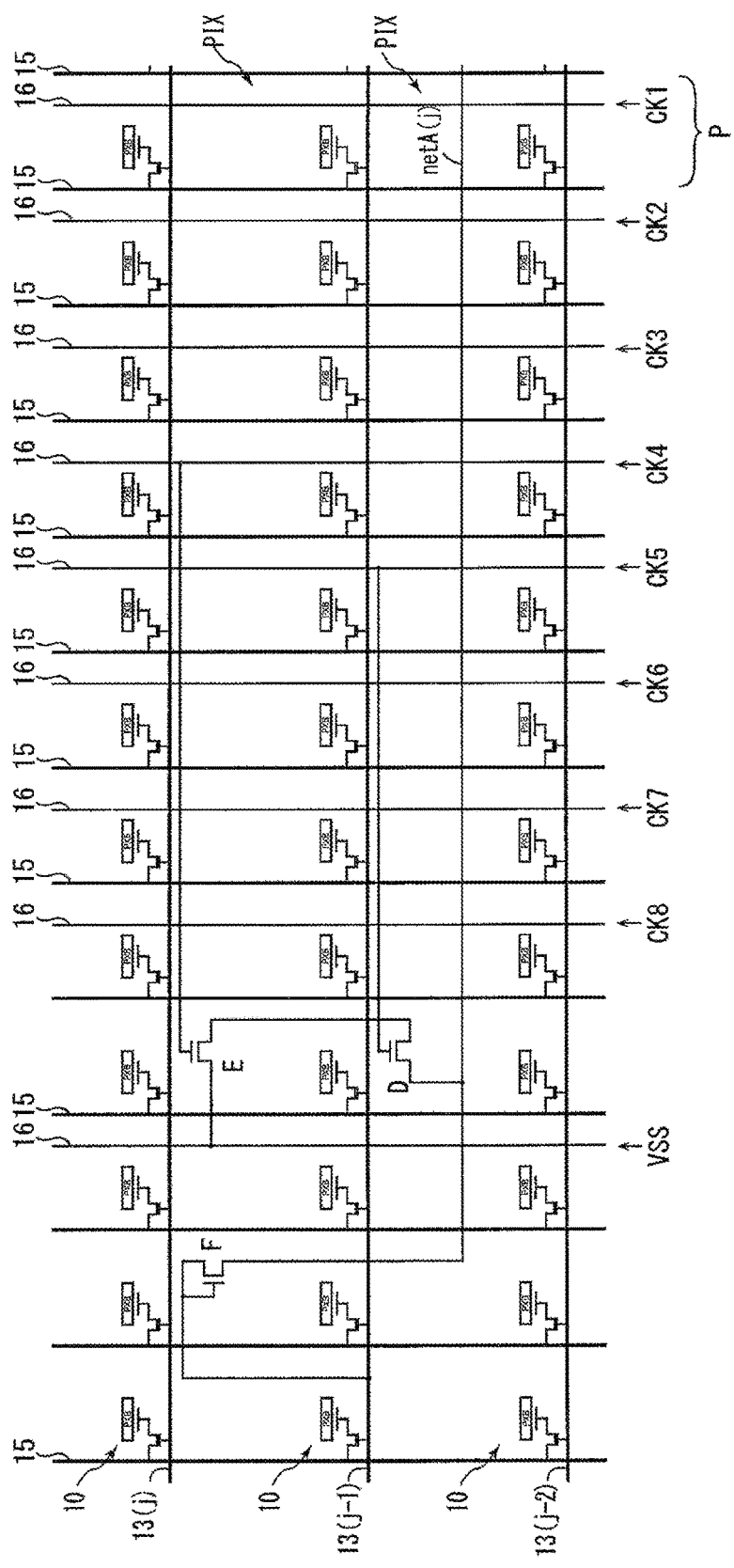
FIG. 13A is a schematic diagram an exemplary arrangement of the gate driver in Embodiment 3.
Figure 13B:
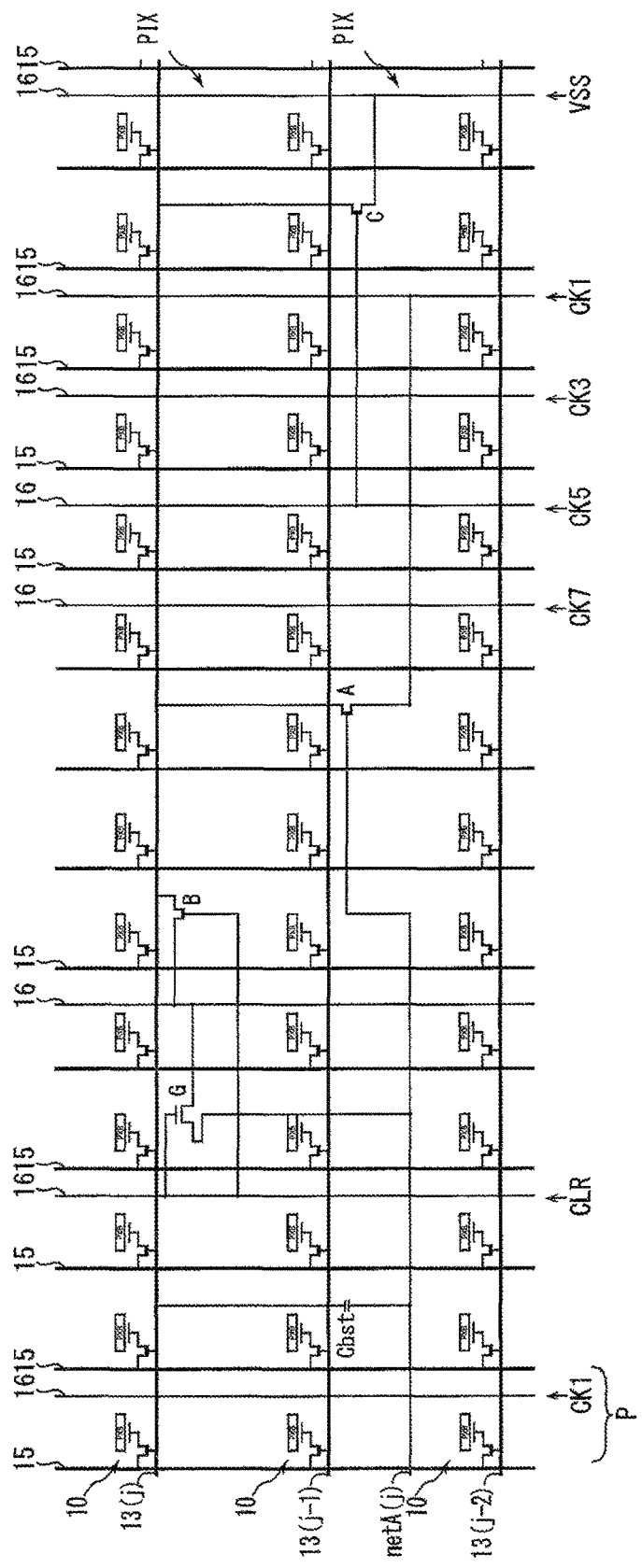
FIG. 13B is a schematic diagram an exemplary arrangement of the gate driver in Embodiment 3.

FIGS. 13A and 13B are schematic diagrams illustrating an exemplary arrangement layout of the gate driver 11A(j) in the present embodiment. FIGS. 13A and 13B are continuous to each other at the column P in the respective diagrams. As illustrated in FIGS. 13A and 13B, the control lines 16 supplying the clock signal CK5 and the clock signal CK1 are arranged to the positions of the TFTs-A and -C arranged between the gate line 13(j−1) and the gate line 13(j−2). Further, as illustrated in FIGS. 13A and 13B, netA(j) is arranged between the gate line 13(j−1) and the gate line 13(j−2).

In this way, none of the driving circuit lines (netA(j) and the control line 16 supplying the clock signal CK51) whose potentials change at the OFF-timing of the gate line 13(j) is arranged in the vicinity of the gate line 13(j), that is, at such a position that a parasitic capacitance is generated between the diving circuit line and the pixel-TFT 10 connected to the gate line 13(j), whereby brightness unevenness caused by the change of the potential of the driving circuit line can be reduced. Further, in the present embodiment, the gate line 13 is driven with use of clock signals having lower frequencies as compared with Embodiment 1. As compared with Embodiment 1 described above, therefore, the time for charging the gate line 13 is longer, which makes it easier to charge the gate line 13 to a potential at the H level, even if the TFTs in the gate driver 11A deteriorate.

<Embodiment 4>

Described as the present embodiment is a case in which clock signals having different duty ratios are input to TFTs (TFTs-C to -E) other than TFT-A as the last buffer of the gate driver 11 in Embodiment 1 described above, whereby the degree of freedom in the arrangement layout of the gate driver 11 is increased. The following description principally describes configurations different from those of Embodiment 1.

Figure 14:
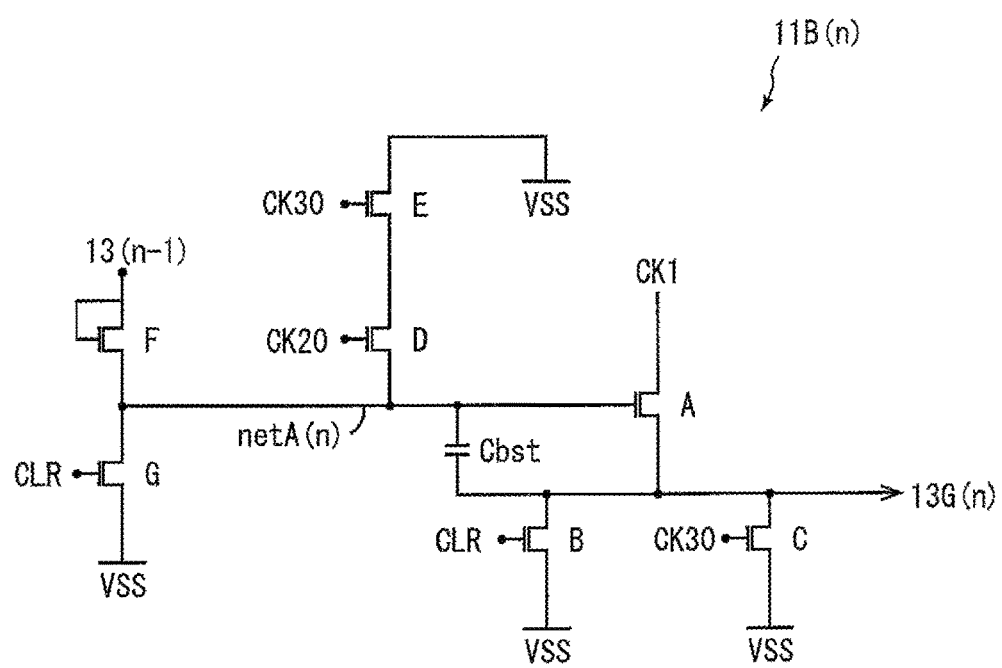
FIG. 14 illustrates an exemplary equivalent circuit of a gate driver in Embodiment 4.

FIG. 14 illustrates an equivalent circuit of a gate driver 11B(n) in the present embodiment. The gate driver 11B(n) has the same configuration as that of the gate driver 11(n) except for a part of the clock signals supplied thereto are different from Embodiment 1.

As illustrated in FIG. 14, in the gate driver 11B(n), the gate terminal and the drain terminal of TFT-F are connected to the gate line 13(n−1). Further, to TFTs-D, -E, and -C, which are the same as those of the gate driver 11(n), clock signals CK20, CK30, and CK30 are supplied in place of the clock signals CK3, CK2, and CK3, respectively.

Figure 15:
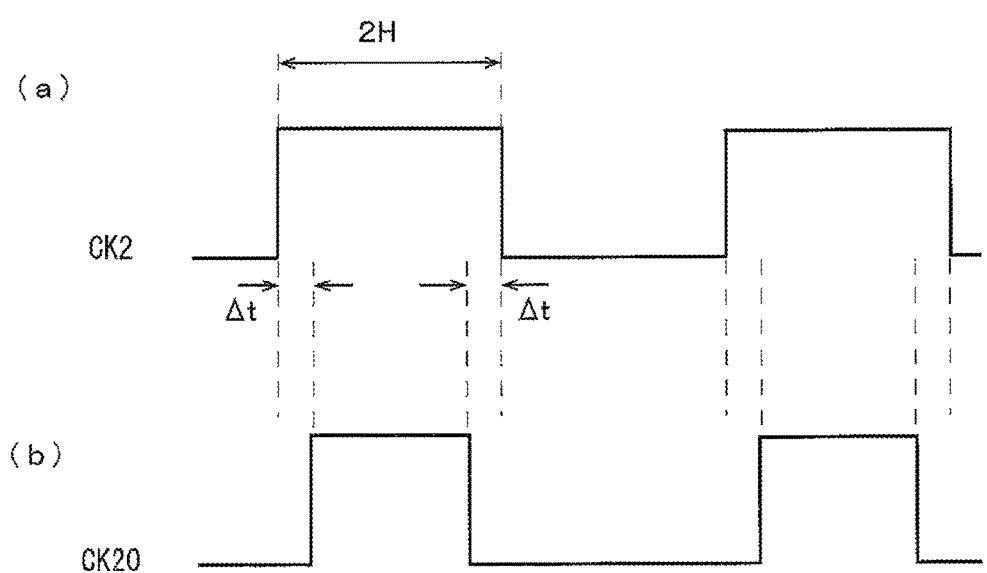
FIGS. 15(*a*) and (*b*) of FIG. 15 illustrate exemplary waveforms of clock signals in Embodiment 4.

Here, exemplary waveforms of the clock signals CK2 and CK20 are illustrated in (a) and (b) of FIG. 15. The clock signal CK2 is a signal whose potential rises/falls to the H level/the L level every two horizontal scanning periods. On the other hand, the potential of the clock signal CK20 rises to the H level at a timing delayed by Δt (for example, 4 μsec) relative to the timing at which the potential of the clock signal CK2 rises to the H level, and falls to the L level at a timing advanced by Δt (for example, 4 μsec) relative to the timing at which the potential of the clock signal CK2 falls to the L level. In other words, the clock signal CK20 is a clock signal having a duty ratio smaller than that of the clock signal CK2. In this diagram, exemplary waveforms of the clock signals CK2 and CK20 are illustrated, and the clock signals CK10, CK30, and CK40 have similar waveforms. In other words, the potentials of the clock signals CK10, CK30, and CK40 rise to the H level at timings delayed by Δt (for example, 4 μsec) relative to the timings at which the potentials of the clock signals CK1, CK3, and CK4 rise to the H level, and fall to the L level at timings advanced by Δt (for example, 4 μsec) relative to the timings at which the potentials of the clock signals CK1, CK3, and CK4 fall to the L level, respectively.

Figure 16:
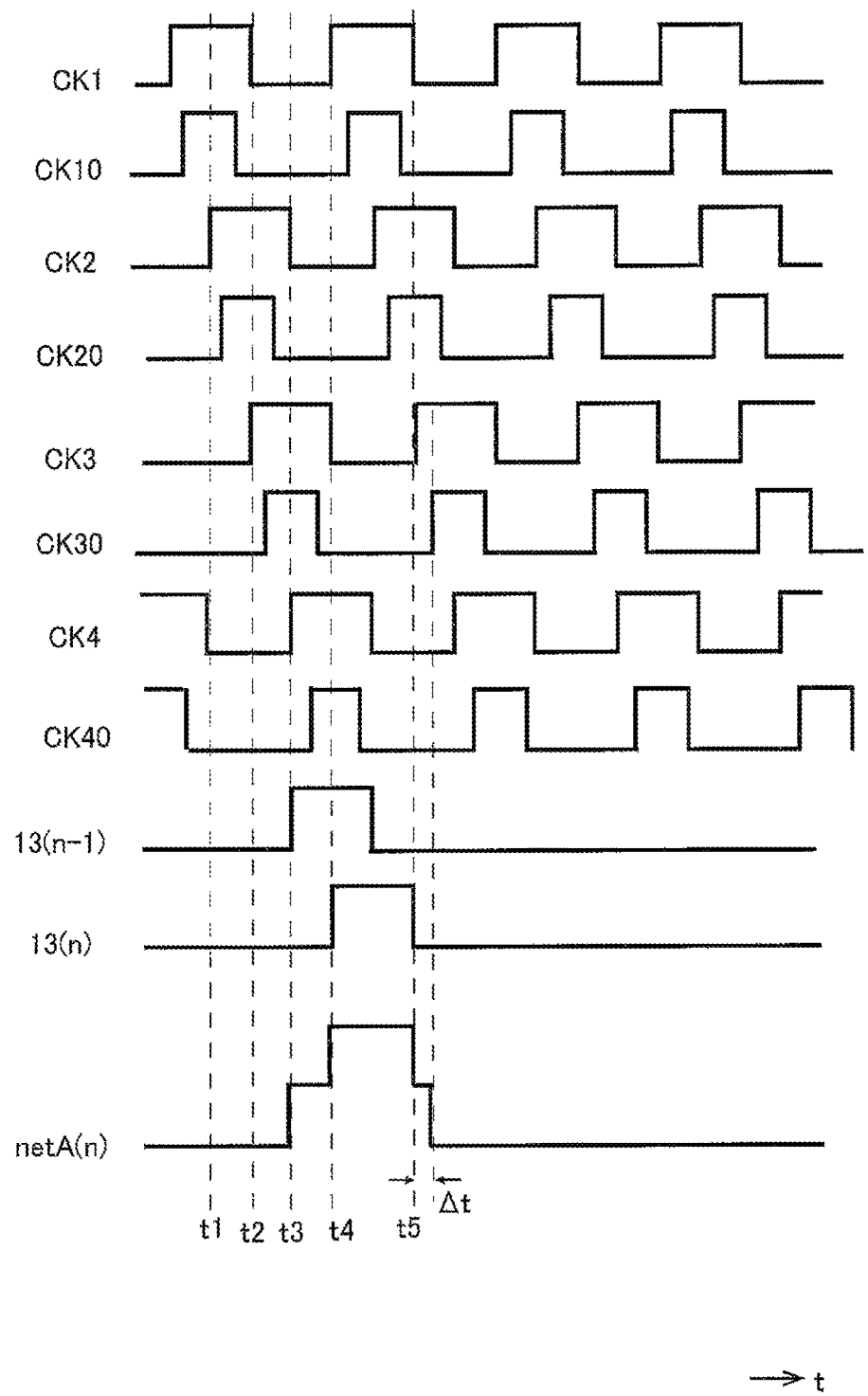
FIG. 16 is a timing chart when the gate driver illustrated in FIG. 14 drives the gate line.

FIG. 16 illustrates exemplary waveforms of the clock signals CK1 to CK4 and the clock signals CK10 to CK40, and a timing chart when the gate driver 11B(n) drives the gate line 13(n).

Since the potential of the gate line 13(n−1) is input to the drain terminal of TFT-F of the gate driver 11B(n), the timing at which the potential of netA(n) rises to the H level is the same as the timing t3 at which the potential of the gate line 13(n−1) rises to the H level. Thereafter, at time t4 when the potential of the clock signal CK1 rises to the H level, TFTs-D and -E are turned OFF since the clock signals CK20 and CK30 have potentials at the L level, and the potential of netA(n) is caused to rise to a level higher than the H level according to the clock signal CK1. At time t5, the potential of the clock signal CK1 falls to the L level, the potential at the L level is input to the gate line 13(n), and the potential of netA(n) rises to the H level. At a timing when Δt has elapsed since time t5, the potentials of the clock signals CK20 and CK30 are at the H level and TFTs-D and -E are in the ON state, whereby the potential of netA(n) is pulled down to the L level.

As illustrated in FIG. 16, the clock signals whose potentials change at time t5, which is the OFF-timing of the gate line 13(n), are the clock signals CK1 and CK3. The clock signal CK1 is supplied to TFT-A of the gate driver 11B(n) illustrated in FIG. 14, while the clock signal CK30 is supplied to TFTs-C and -E of the gate driver 11B(n). The potential of the clock signal CK30 does not change at time t5, which is the OFF-timing of the gate line 13(n). In the present embodiment, therefore, the control lines 16 that supply the clock signals other than the clock signal CK1 can be arranged in the vicinity of the gate line 13(n), that is, in the vicinity of the pixel-TFTs 10 connected to the gate line 13(n).

Figure 17A:
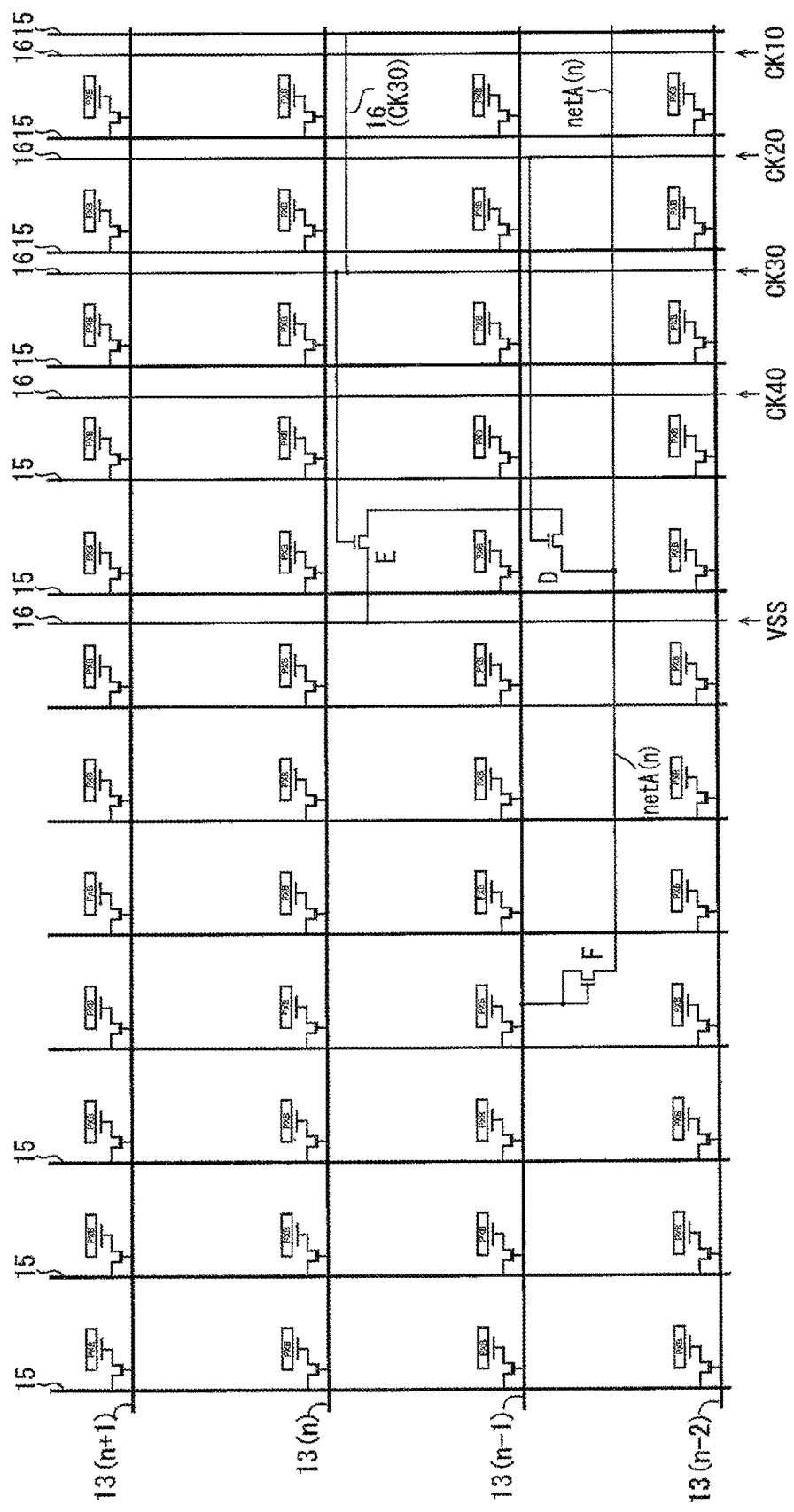
FIG. 17A is a schematic diagram illustrating an exemplary arrangement of the gate driver illustrated in FIG. 14.
Figure 17B:
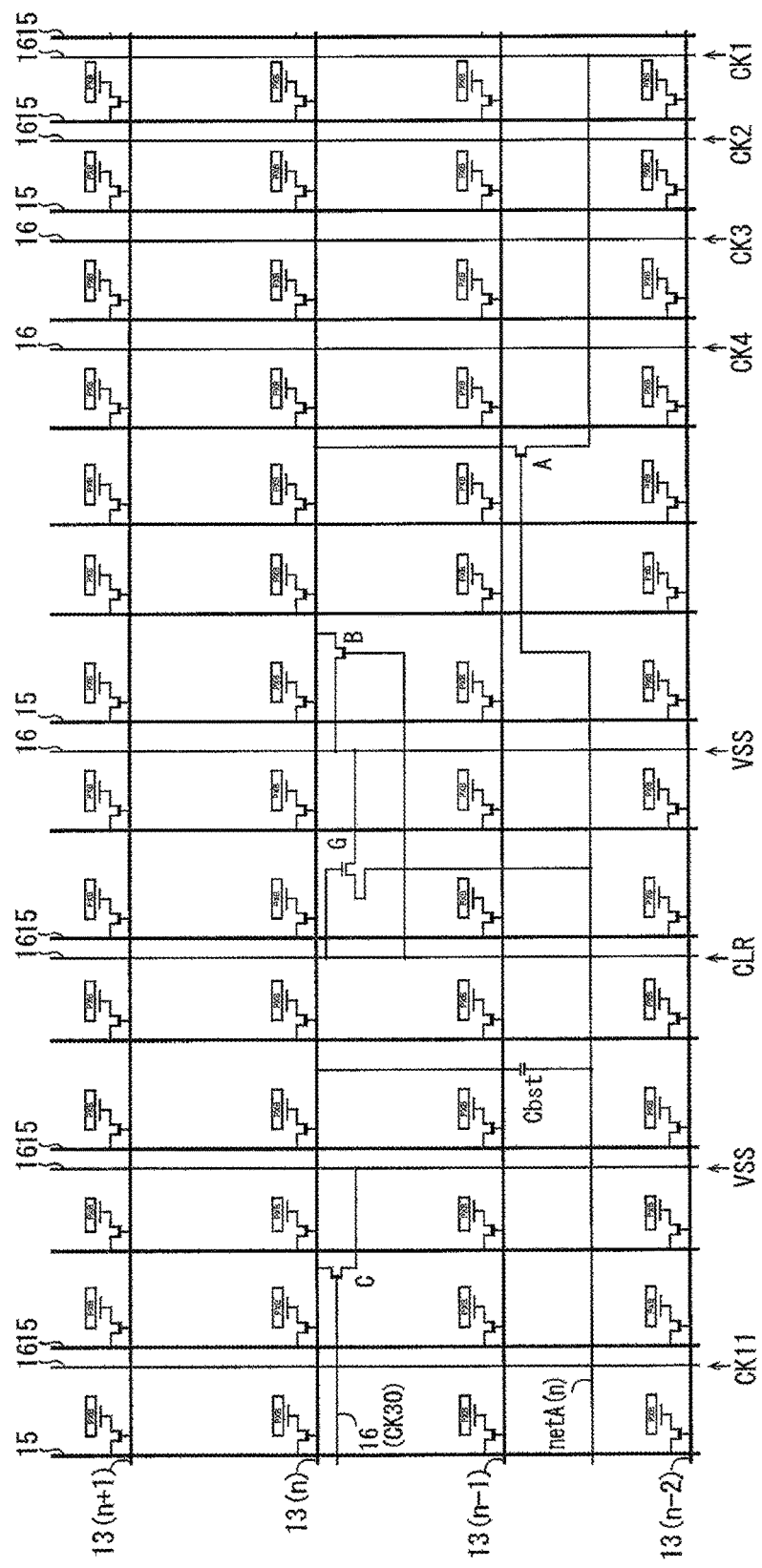
FIG. 17B is a schematic diagram illustrates an exemplary arrangement of the gate driver illustrated in FIG. 14.

FIGS. 17A and 17B is a schematic diagram illustrating an exemplary arrangement layout of the gate driver 11B(n). As illustrated in FIGS. 17A and 17B, the control lines 16 supplying the clock signals CK10 to CK40, in addition to the control lines 16 supplying the clock signals CK1 to CK4, are provided in the pixels. In the present embodiment as well, the potentials of the clock signals CK1 and netA(n) change at the OFF-timing of the gate line 13(n). TFT-A to which the clock signal CK1 is input is arranged in a pixel in a row between the gate lines 13(n−1) and 13(n−2), and netA(n) and the control line 16 supplying the clock signal CK1 are arranged to the pixel where TFT-A is arranged.

As described above, the potential of the clock signal CK30 does not change at the OFF-timing of the gate line 13(n). In the present embodiment, therefore, as illustrated in FIG. 17B, TFT-C is arranged in the vicinity of the gate line 13(n), and the control line 16 supplying the clock signal CK30 illustrated in FIG. 17A is arranged to the position of TFT-C. The same applies to TFT-D, since not the control line 16 supplying the clock signal CK2 but the control line 16 supplying the clock signal CK20 is connected thereto.

Further, since the potentials of the clock signals CK10 to CK40 do not change at the OFF-timing of the gate line 13, no limitation is put on the control lines 16 supplying these clock signals regarding the arrangement of the same. As compared with Embodiment 1, therefore, it is possible to reduce the pixel region for arranging the gate drivers 11B, and to shorten the length of the driving circuit lines such as the control lines 16 and netA, thereby making it possible to reduce the loads caused by the lines.

<Embodiment 5>

Described as the present embodiment is an example in which a gate driver having a configuration different from the configuration of the gate driver 11 in Embodiment 1 described above is used.

Figure 18:
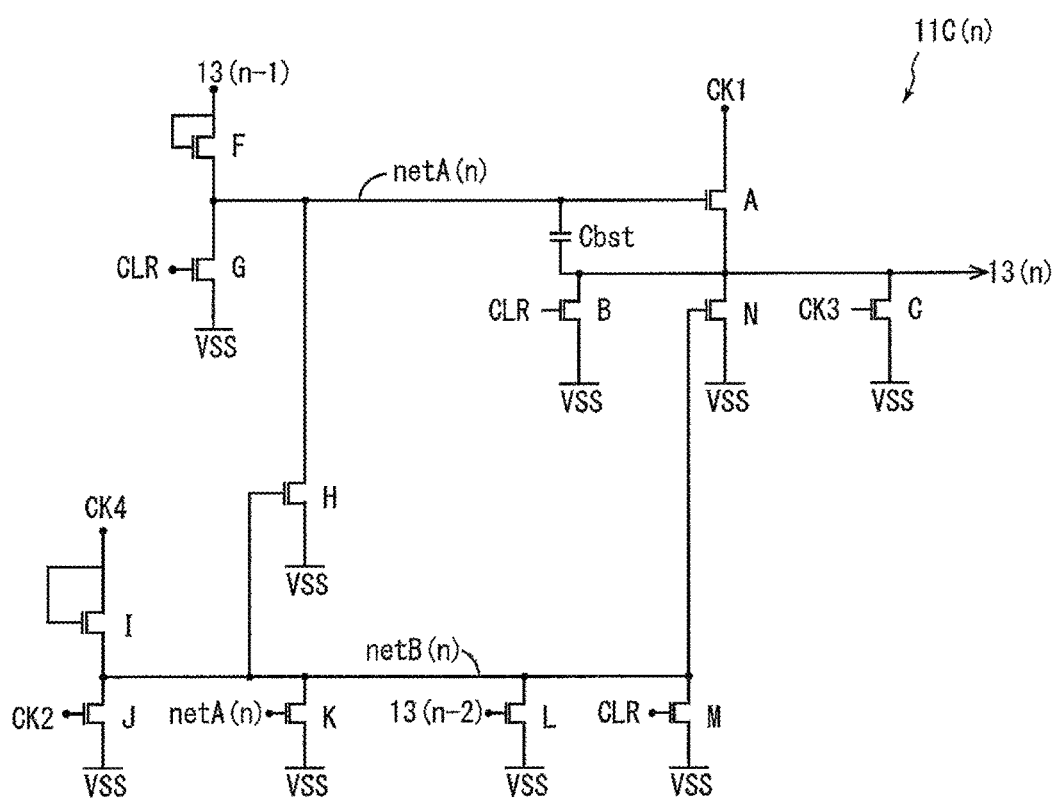
FIG. 18 illustrates an exemplary equivalent circuit of a gate driver in Embodiment 5.

FIG. 18 illustrates an equivalent circuit of a gate driver of the present embodiment. In FIG. 18, an exemplary gate driver 11C(n) that drives the gate line 13(n) is illustrated, and gate drivers 11C that drive the other gate lines 13 have the same configurations as that of the gate driver 11C(n) except for the clock signals supplied thereto are different. The gate drivers 11C in the present embodiment are driven with use of the clock signals CK1 to CK4 identical to those in Embodiment 1.

The following description principally describes configurations of the gate driver 11C(n) different from those of the gate driver 11(n).

As illustrated in FIG. 18, the gate driver 11C(n) includes the same TFTs-A to -C, TFT-G, and capacitor Cbst as those of the gate driver 11(n), and further includes TFTs-H to -N denoted by alphabetic characters H to N, whereas the gate driver 11C(n) does not include TFTs-E and -D unlike the gate driver 11(n).

In FIG. 18, the gate driver 11C(n) includes netB(n) as an internal line, in addition to netA(n). NetB(n) is an internal line that connects the gate terminals of TFTs-H and -N, the source terminal of TFT-I, and the drain terminals of TFTs-J, -K, -L, and -M. As is the case with netA, netB is formed in the same layer as the gate lines 13 and the source lines 15, in the active matrix substrate 20a.

The gate terminal and the drain terminal of TFT-F are connected to the gate line 13(n−1), and the source terminal thereof is connected to netA(n).

The gate terminal of TFT-H is connected to netB(n), the drain terminal thereof is connected to netA(n), and to the source terminal thereof, the power source voltage signal VSS is supplied.

The clock signal CK4 is supplied to the gate terminal and the drain terminal of TFT-I, and the source terminal thereof is connected to netB(n).

The clock signal CK2 is supplied to the gate terminal of the TFT-J, the power source voltage signal VSS is supplied to the source terminal thereof, and the drain terminal thereof is connected to netB(n).

The gate terminal of TFT-K is connected to netA(n), the drain terminal thereof is connected to netB(n), and the power source voltage signal VSS is supplied to the source terminal thereof.

The gate terminal of TFT-L is connected to the gate line 13(n−2), the drain terminal thereof is connected to netB(n), and the power source voltage signal VSS is supplied to the source terminal thereof.

The reset signal CLR is supplied to the gate terminal of TFT-M, the drain terminal thereof is connected to netB(n), and the power source voltage signal VSS is supplied to the source terminal thereof.

The gate terminal of TFT-N is connected to netB(n), the drain terminal thereof is connected to the gate line 13(n), and the power source voltage signal VSS is supplied to the source terminal thereof.

Figure 19:
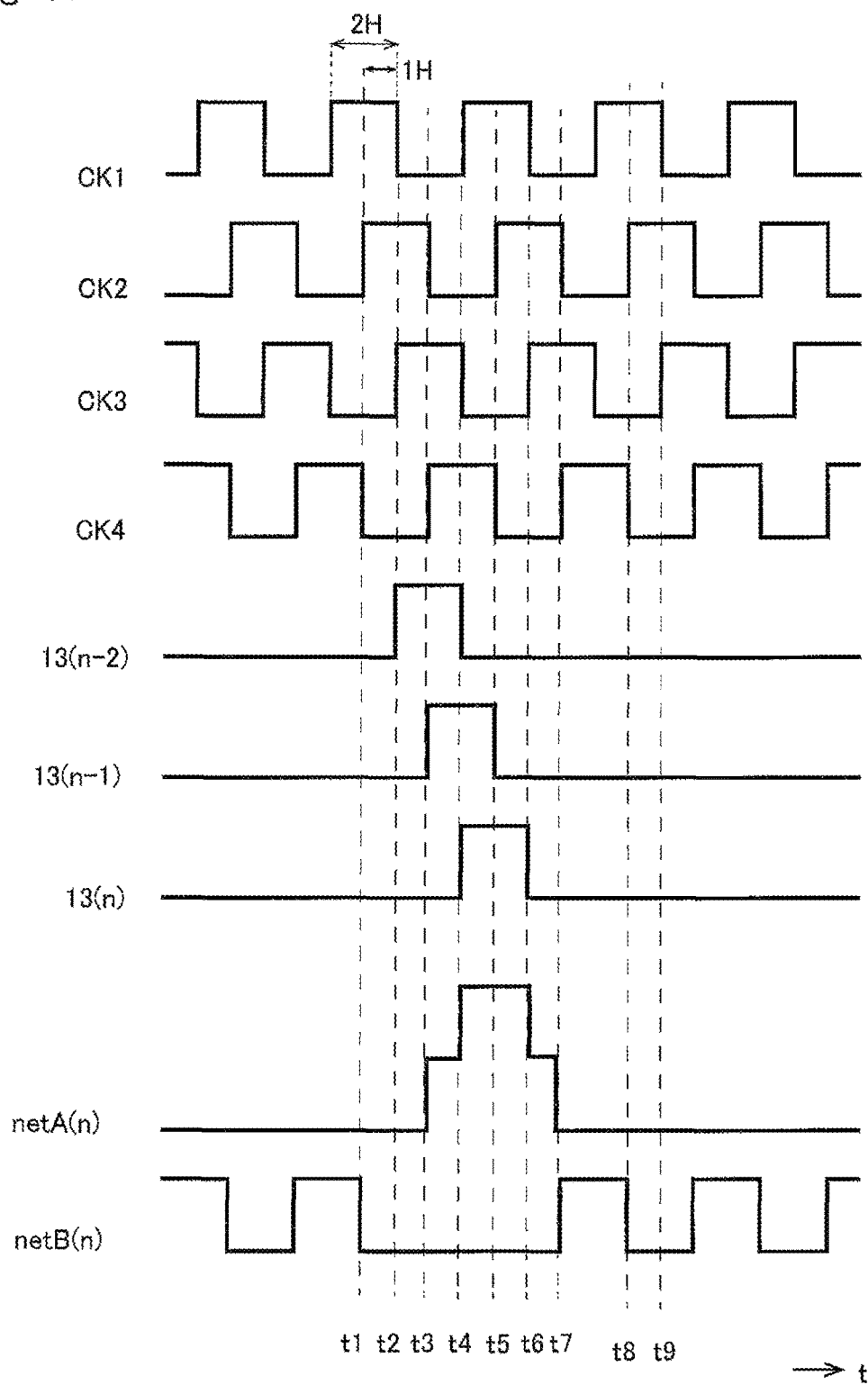
FIG. 19 is a timing chart when the gate driver illustrated in FIG. 18 drives a gate line.

Next, the following description describes the operation of the gate driver 11C(n). FIG. 19 is a timing chart when the gate driver 11C(n) drives the gate line 13(n).

The potential of netB(n) rises/falls to the H level/the L level according to the potentials of the clock signal CK2 or CK4, the gate line 13(n−2), and netA(n). In other words, as illustrated in FIG. 19, for example, when the potential of the clock signal CK2 rises to the H level at time t1, TFT-J is turned ON and the potential of netB(n) falls to the L level. At time t2 as well, the potential of the gate line 13(n−2) rises to the H level and the clock signal CK2 maintains the potential at the H level. This causes TFT-L together with TFT-J to be turned ON, thereby causing netB(n) to hold the potential at the L level.

Subsequently, at time t3, the potential of the gate line 13(n−1) rises to the H level, and TFT-F is turned ON. This causes netA(n) to be precharged to the potential at the H level. Here, the potential of the clock signal CK4 rises to the H level, and TFT-I is turned ON, but the gate line 13(n−2) maintains the potential at the H level. TFT-L therefore remains in the ON states. At time t3, therefore, the potential of netB(n) remains at the L level.

Next, at time t4, the potential of the clock signal CK4 rises to the H level, and TFT-A is in the ON state, whereby the potential of netA(n) is boosted up to a potential at a level higher than the H level, via the capacitor Cbst. Here, since TFT-K is in the ON state, netB(n) maintains the potential at the L level.

At time t5, the potential of netA(n) remains at the H level, and the potential of the clock signal CK2 rises to the H level.

TFT-J as well as TFT-K are therefore turned ON, and netB(n) maintains the potential at the L level.

At time t6, the clock signals CK2 and CK3 have potentials at the H level, while the clock signals CK1 and CK4 have potentials at the L level. Here, TFTs-I and -K to -M are in the OFF state, while TFTs-J and -C are in the ON state. This causes the potential of the gate line 13(n) to be pulled down to the L level, and the potential of netA(n) falls to the H level. NetB(n) maintains the potential at the L level.

At time t7, the potential of the clock signal CK4 rises to the H level, and the potential of the clock signal CK2 falls to the L level. Here, since TFTs-J to -M are in the OFF state, the potential of netB(n) is at the H level. This causes TFT-H to be turned ON, and the potential of netA(n) is pulled down to the L level.

After time t6, the potentials of the gate line 13(n−2) and netA(n) are at the L level. The potential of netB(n), therefore, falls to the L level when the potential of the clock signal CK2 or CK4 rises to the H level, and the potential of netB(n) rises to the H level when the potential of the clock signal CK2 or CK4 falls to the L level.

Besides, the potential of the gate line 13(n) is pulled down to the L level, according to the potentials of the clock signal CK3 and netB(n). In other words, when the potential of the clock signal CK3 rises to the H level at time t6, TFT-C is turned ON, and the potential of the gate line 13(n) is pulled down to the L level. Further, when the potential of netB(n) rises to the H level at time t7, the potential of netB(n) at the H level is input to the gate terminal of TFT-N, thereby causing TFT-N to be turned ON, and the gate line 13(n) maintains the potential at the L level. Here, at time t8, the potentials of the clock signal CK3 and netB(n) are at the L level, while at time t9, the potential of the clock signal CK3 rises to the H level, which causes the gate line 13(n) to maintain the potential at the L level.

In this way, the configuration of the gate driver 11C(n) is such that at the timing when the potential of the gate line 13(n) is pulled down to the L level, netA(n) and the gate line 13(n) maintain the potentials thereof at the L level. As a result, it is possible to prevent noise caused by malfunctions of the gate driver 11C(n) from being input to the gate line 13(n) during a gate line 13(n) non-selected period.

Figure 20A:
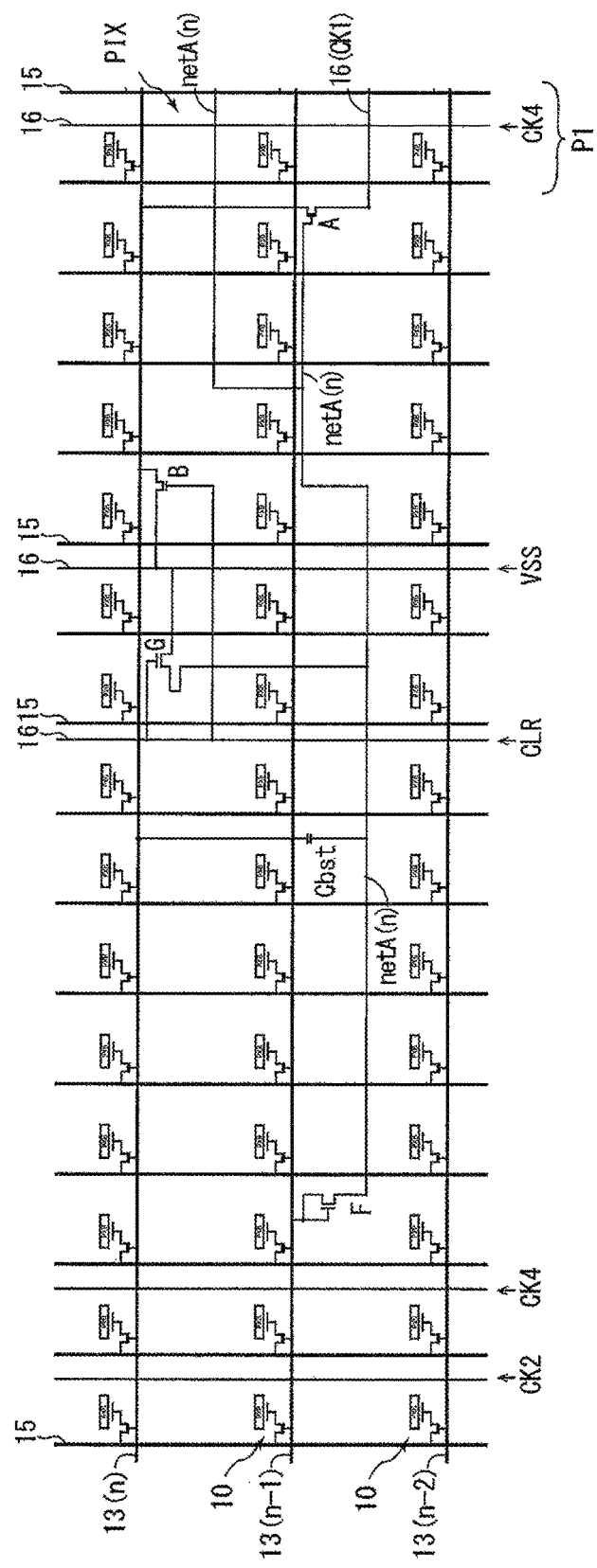
FIG. 20A is a schematic diagram illustrating an exemplary arrangement of the gate driver illustrated in FIG. 18.
Figure 20B:
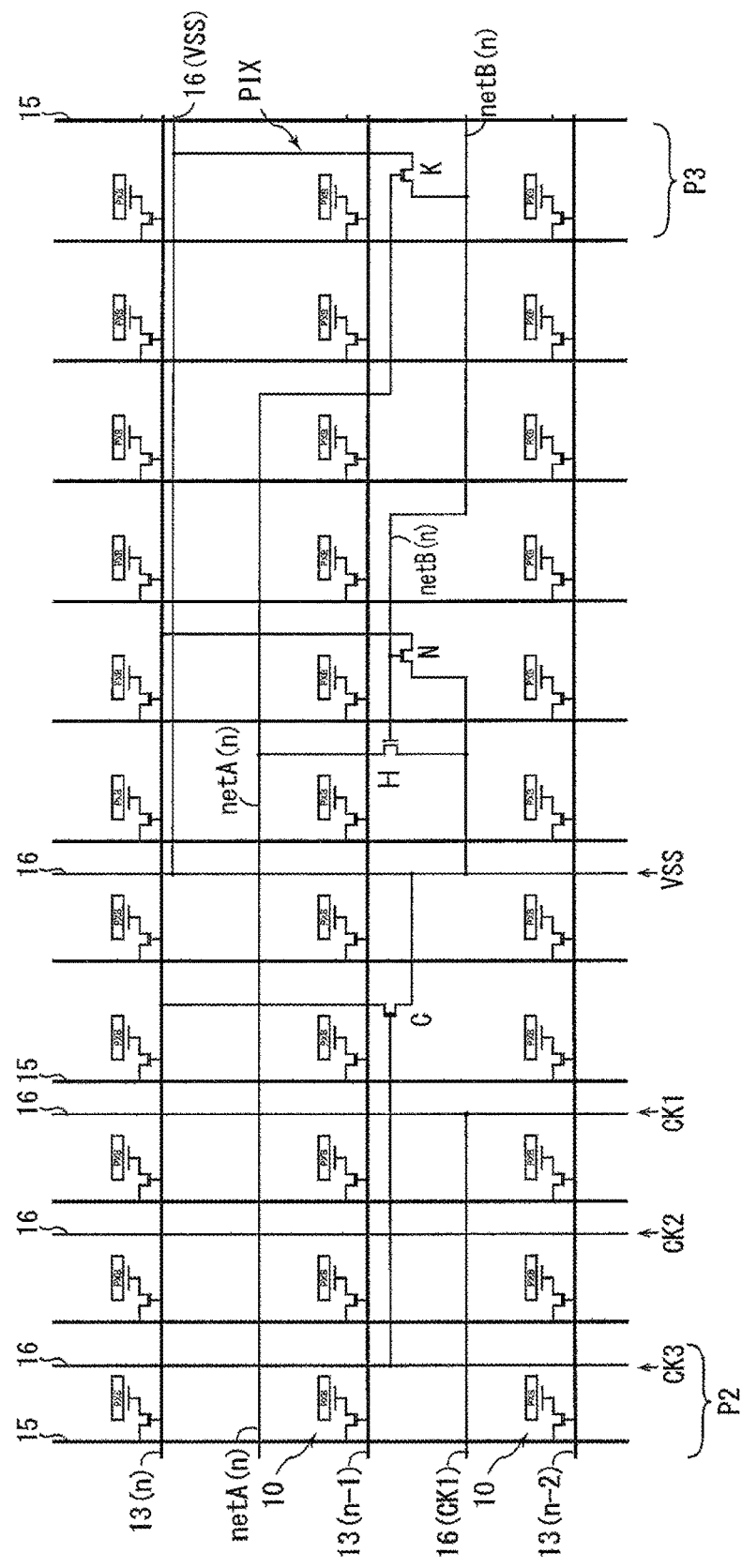
FIG. 20B is a schematic diagram illustrating an exemplary arrangement of the gate driver illustrated in FIG. 18.
Figure 20C:
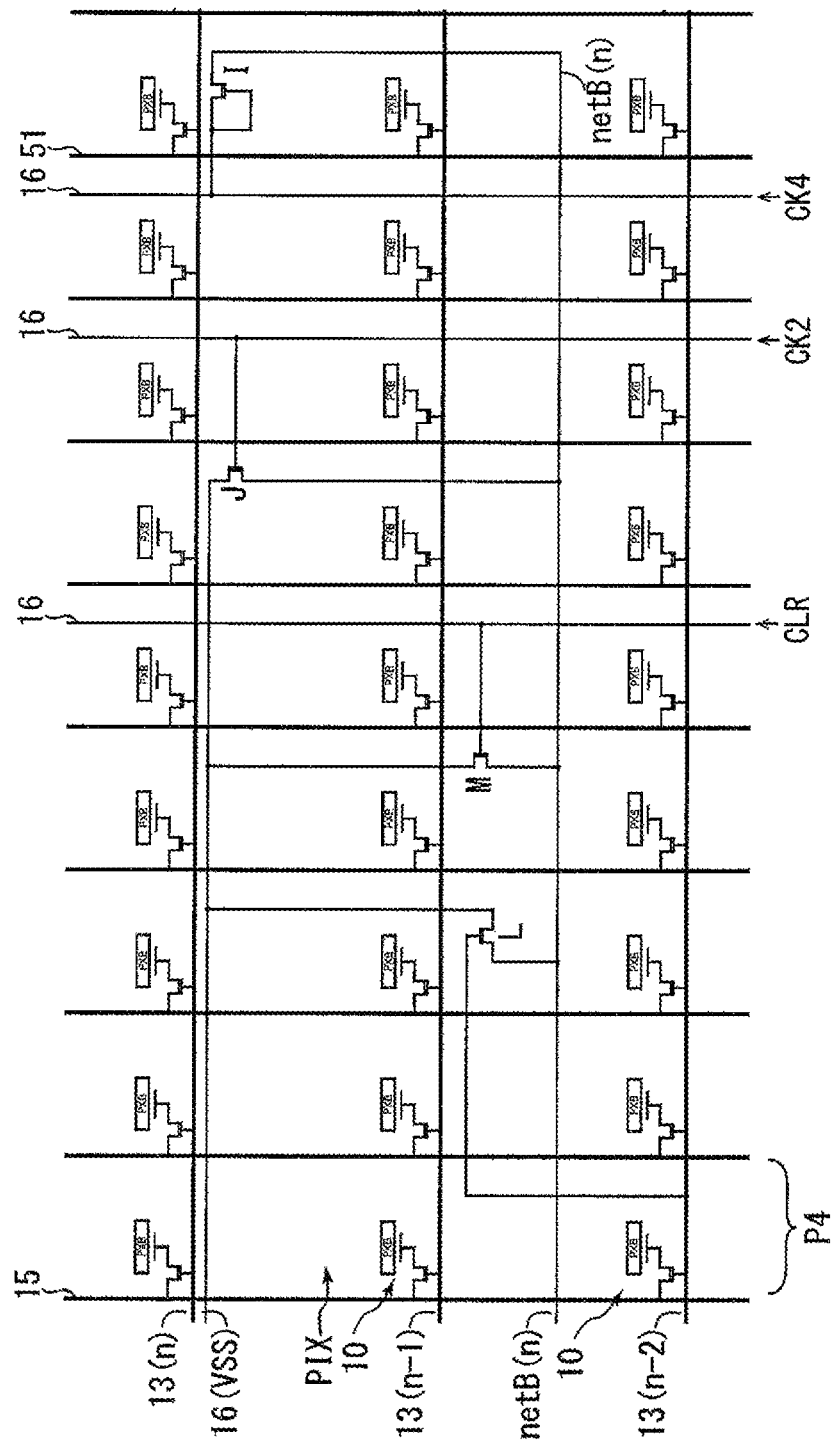
FIG. 20C is a schematic diagram illustrating an exemplary arrangement of the gate driver illustrated in FIG. 18.

Next, the following description describes the arrangement of the gate driver 11C(n). FIGS. 20A to 20C are schematic diagrams illustrating an exemplary arrangement layout of the gate driver 11C(n). FIG. 20A and FIG. 20B are continuous to each other so that the column P1 in FIG. 20A and the column P2 in FIG. 20B are adjacent to each other. Further, FIG. 20B and FIG. 20C are continuous to each other so that the column P3 in FIG. 20B and the column P4 in FIG. 20C area adjacent to each other.

In the present embodiment as well, as illustrated in FIG. 19, the potentials of the clock signals CK1 and CK3, as well as netA(n) change at the OFF-timing of the gate line 13(n). As illustrated in FIGS. 20A and 20B, therefore, the control lines 16 that supply the clock signals CK1 and CK3, respectively, and are arranged approximately in parallel with the gate line 13 are arranged in a pixel region between the gate lines 13(n−1) and 13(n−2), and are connected with TFT-A and TFT-C.

Further, as illustrated in FIG. 20A and FIG. 20B, a part of netA(n) is arranged dispersedly in the pixels PIX between the gate lines 13(n) and 13(n−1), and the other part thereof is arranged dispersedly in the pixels PIX between the gate lines 13(n−1) and 13(n−2). The part of netA(n), arranged in the pixels PIX between the gate lines 13(n) and 13(n−1), are arranged approximately at a midpoint between the gate lines 13(n) and 13(n−1), and by so doing, influences of noise due to the change of the potential of netA(n) are reduced, as compared with a case where the part of netA(n) is arranged in the vicinity of the gate line 13(n).

<Embodiment 6>

Described as Embodiment 1 above is an example in which the elements composing the gate driver 11(n) are arranged in pixels of two rows. Described as the present embodiment herein is an example in which the respective elements composing the gate driver are arranged in pixels of one row.

Figure 21:
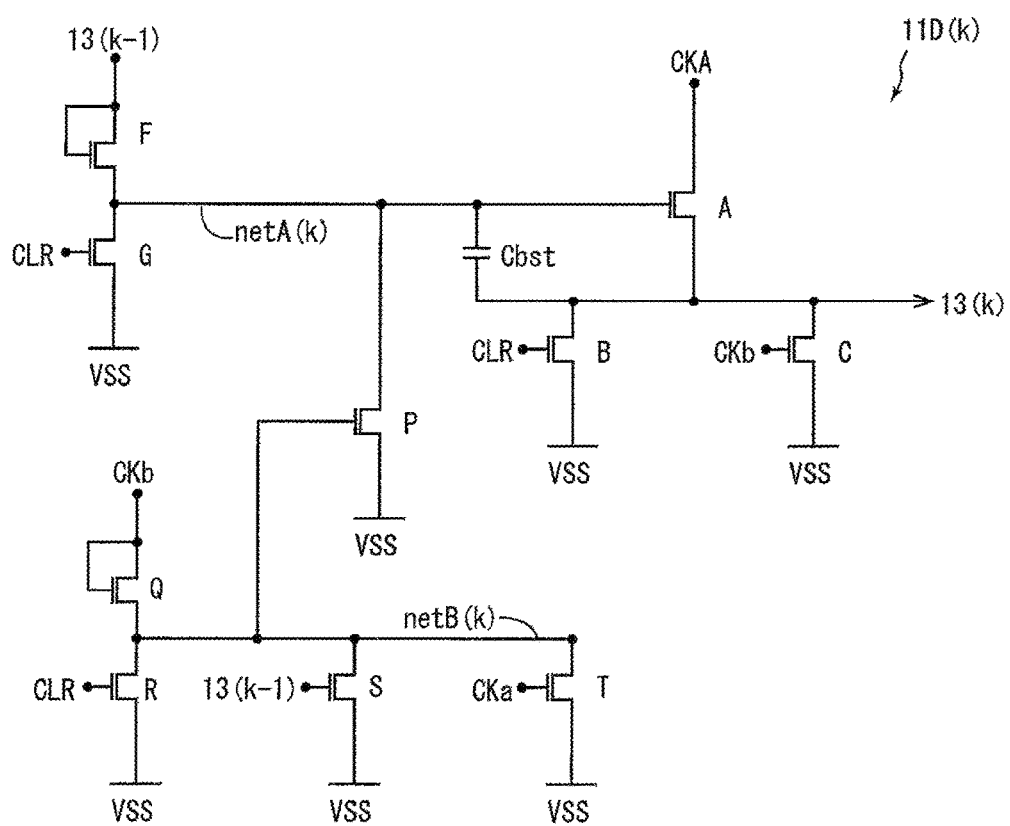
FIG. 21 illustrates an exemplary equivalent circuit of a gate driver in Embodiment 6.

FIG. 21 illustrates an equivalent circuit of a gate driver in the present embodiment. FIG. 21 illustrates an equivalent circuit of the gate driver 11D(k) that drives the gate line 13(k). Here, k=2m+1, where m represents an integer equal to or greater than 0. The gate driver 11D(k) is therefore a gate driver that drives gate lines 13(1), (3), (5) . . . of odd-number stages. To the gate driver 11D(1) driving the gate line 13(1), the gate startpulse signal, in place of the potential of the gate line 13(k−1), is input from the display control circuit 4. Further, the gate drivers 11D that drive the gate lines 13 of the even-number stages have the same configuration as that of the gate driver 11D(k) except that clock signals different from those supplied to the gate driver 11D(k) are supplied thereto.

As illustrated in FIG. 21, the gate driver 11D(k) includes the same TFTs-A to -C, -E, and -D as well as capacitor Cbst as those of the gate driver 11(n), and further includes TFTs-P to -T denoted by alphabetic characters P to T, whereas the gate driver 11D(k) does not include TFTs-E and -D unlike the gate driver 11(n). The following description principally describes configurations different from the gate driver 11(n).

In FIG. 21, the gate driver 11D(k) includes netB(k) as an internal line, in addition to netA(k). NetB(k) is an internal line that connects the gate terminal of TFT-P, the source terminal of TFT-Q, and drain terminals of TFTs-R, -S, and -T.

The gate terminal and the drain terminal of TFT-F are connected to the gate line 13(k−1), and the source terminal thereof is connected to netA(k).

To the drain terminal of TFT-A, the clock signal CKA is supplied.

To the gate terminal of TFT-C, the clock signal CKb is supplied.

The gate terminal of TFT-P is connected to netB(k), the drain terminal thereof is connected to netA(k), and to the source terminal thereof, the power source voltage signal VSS is supplied.

The clock signal CKb is supplied to the gate terminal and the drain terminal of TFT-Q, and the source terminal thereof is connected to netB(k).

The reset signal CLR is supplied to the gate terminal of TFT-R, the power source voltage signal VSS is supplied to the source terminal thereof, and the drain terminal is connected to netB(k).

The gate terminal of TFT-S is connected to the gate line 13(k−1), the drain terminal thereof is connected to netB(k), and the power source voltage signal VSS is supplied to the source terminal thereof.

The clock signal CKa is supplied to the gate terminal of TFT-T, the drain terminal thereof is connected to netB(k), and the power source voltage signal VSS is supplied to the source terminal thereof.

Figure 22:
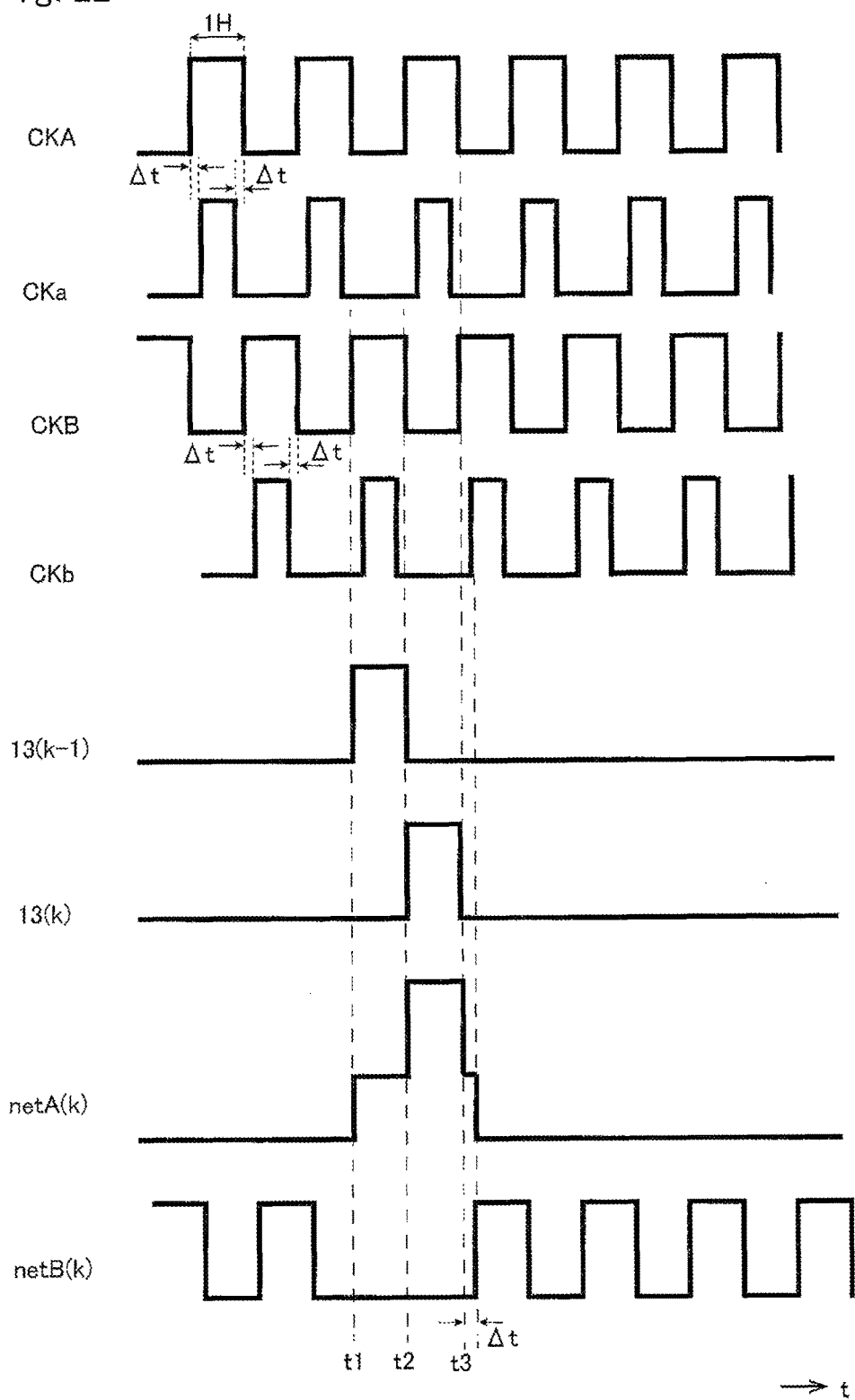
FIG. 22 is a timing chart when the gate driver illustrated in FIG. 21 drives a gate line.

FIG. 22 illustrates exemplary waveforms of the clock signals used in the present embodiment, and a timing chart when the gate driver 11D(k) drives the gate line 13(k).

As illustrated in FIG. 22, in the present embodiment, four clock signals CKA, CKB, CKa, and CKb are supplied from the display control circuit 4. The clock signals CKA and CKB are signals having the following characteristics: the potentials rise/fall to the H level/the L level every horizontal scanning period; and the phases thereof are opposite to each other. Besides, the potential of the clock signal CKa rises to the H level at a timing delayed by Δt (for example, 4 μsec) relative to the timing at which the potential of the clock signal CKA rises to the H level, and falls to the L level at a timing advanced by Δt (for example, 4 μsec) relative to the timing at which the potential of the clock signal CKA falls to the L level. Still further, the potential of the clock signal CKb rises to the H level at a timing delayed by Δt (for example, 4 μsec) relative to the timing at which the potential of the clock signal CKB rises to the H level, and falls to the L level at a timing advanced by Δt (for example, 4 μsec) relative to the timing at which the potential of the clock signal CKB falls to the L level. In other words, the clock signals CKa and CKb are clock signals that have duty ratios smaller than those of the clock signals CKA and CKB, respectively.

The clock signals CKB, CKb, and CKa, in place of the clock signals CKA, CKa, and CKb supplied to the gate driver 11D(k), are supplied to the gate driver 11D that drives the gate line 13 of the even-number stage, respectively.

The following description describes the operation of the gate driver 11D(k), while referring to FIGS. 21 and 22. At time t1, the potential of the gate line 13(k−1) rises to the H level, thereby causing TFT-F and TFT-S to be turned ON. This causes netB(k) to maintain the potential at the L level, and causes netA(k) to be precharged to the potential at the H level with the potential of the gate line 13(k−1). Then, a potential of netA(n) at the H level is input to the gate terminal of TFT-A, thereby causing TFT-A to be turned ON. The potential of the clock signal CKA is at the L level, and the gate line 13(k) maintains the potential at the L level.

Next, at time t2, since the potential of the gate line 13(k−1) is at the L level, the potential of the clock signal CKA is at the H level, and the potential of the clock signal CKb at the L level, TFT-C and TFT-F are in the OFF state, while TFT-A is in the ON state. With this, the potential of the clock signal CKA at the H level is input to the gate line 13(k) from the drain terminal of TFT-A, and the potential of netA(k) is boosted up to a level higher than the H level, through the capacitor Cbst.

At time t3, since the potential of the clock signal CKA is at the L level, the potential of the gate line 13(k) falls to the L level due to the potential of the drain terminal of TFT-A, and the potential of netA(k) also falls through the capacitor Cbst. Subsequently, at a timing delayed by Δt relative to time t3, the potential of the clock signal CKb rises to the H level, and TFT-C and TFT-Q are turned ON. With this, the gate line 13(k) maintains the potential at the L level, and the potential of netB (k) rises to the H level due to the potential of the drain terminal of TFT-Q. As a result, TFT-P is turned ON, and the potential of netA(k) is pulled down to the L level.

After Δt has elapsed since time t3, TFTs-Q and -T are turned ON/OFF according to the potentials of the clock signals CKa and CKb, and accordingly, the potential of netB(k) rises/falls to the H level/the L level. Whenever the potential of netB(k) rises to the H level, TFT-P is turned ON, whereby the potential at the L level is input to netA(k). Further, TFT-C is turned ON/OFF according to the potential of the clock signal CKb, and whenever TFT-C is turned ON, the potential at the L level is input to the gate line 13(k).

In this way, after the timing when the potential of the gate line 13(k) is pulled down to the L level, netA(k) and the gate line 13(k) maintain the potentials at the L level. This makes it possible to prevent noise caused by malfunctions of the gate driver 11D(k) from being input to the gate line 13(k).

Figure 23A:
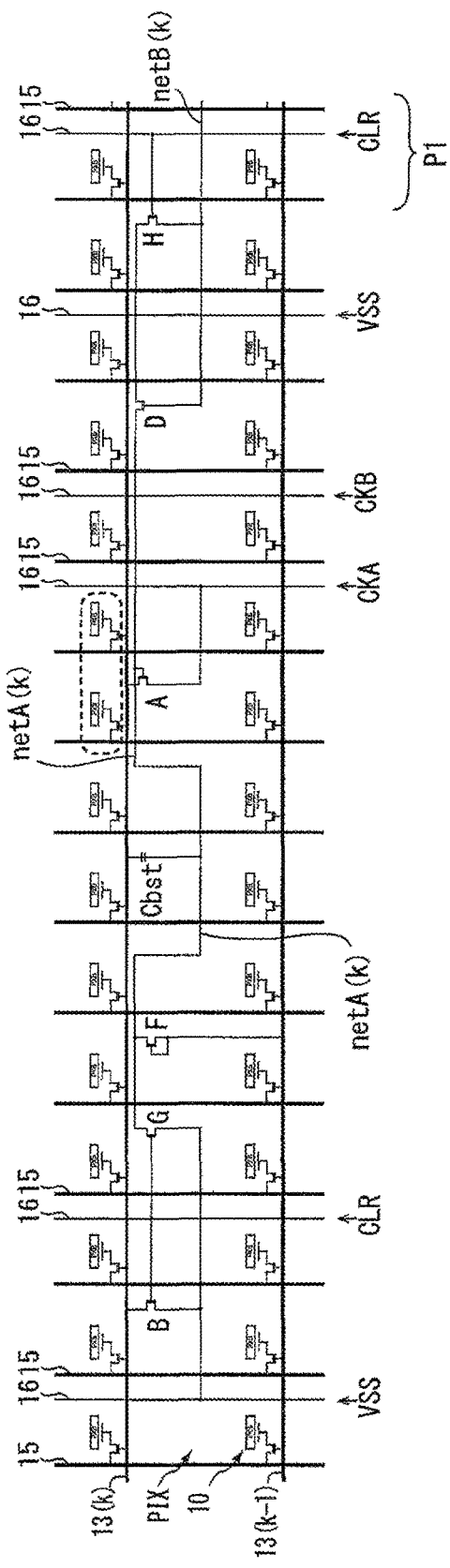
FIG. 23A is a schematic diagram illustrating an exemplary arrangement of the gate driver illustrated in FIG. 21.
Figure 23B:
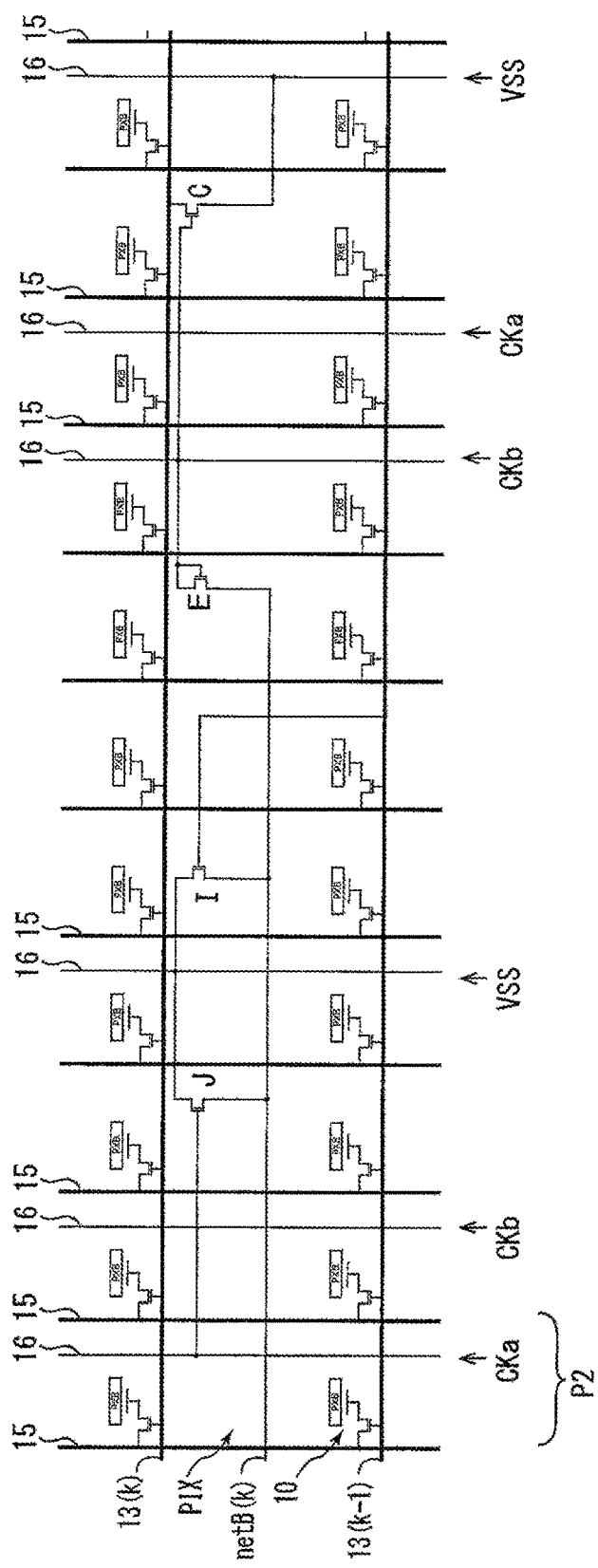
FIG. 23B is a schematic diagram illustrating an exemplary arrangement of the gate driver illustrated in FIG. 21.

Next, the following description describes an arrangement layout of the gate driver 11D. FIGS. 23A and 23B are schematic diagrams illustrating an exemplary arrangement layer of the gate driver 11D(k). FIG. 23A and FIG. 23B are assumed to be continuous to each other so that the column P1 in FIG. 23A and the column P2 in FIG. 23B are adjacent to each other.

As illustrated in FIGS. 23A and 23B, the respective elements of the gate driver 11D(k) are arranged dispersedly in the pixels PIX between the gate lines 13(k) and 13(k−1). In this arrangement layout, netA(k) and the control lines 16 that supply the clock signals CKa and CKb are arranged in the vicinity of the gate line 13(k).

As illustrated in FIG. 22, regarding the gate driver 11D(k), the potentials of netB(k) and the clock signals CKa, CKb do not change at the OFF-timing of the gate line 13(k). Further, the potential of netA(k), after being boosted up to a potential at a level higher than the H level, falls to the H level at the OFF-timing of the gate line 13(k), and thereafter, the potential is pulled down to the L level. In this way, the potential of netA(k) is pulled down to the L level in two steps, which results in the reduction of influences of noise caused by the change of the potential of netA(k), as compared with the case where the potential is pulled down to the L level at one time. Therefore, even if netA(k) and the control lines 16 that supply the clock signals CKa and CKb are arranged in the vicinity of the gate line 13(k) as illustrated in FIGS. 23A and 23B, the pixel electrodes PXB arranged in the vicinity of these driving circuit lines are hardly affected by noise caused by the change of the potentials of the driving circuit lines.

Further, the potential of the clock signal CKA changes at the OFF-timing of the gate line 13(k), as illustrated in FIG. 22. To cope with this, the control line 16 that supplies the clock signal CKA is arranged approximately at a midpoint between the gate lines 13(k) and 13(k−1), and is connected with TFT-A, as illustrated in FIG. 23A. In this way, the control line 16 that supplies the clock signal CKA is arranged so as to be apart from the gate line 13(k), and therefore, the pixel electrodes PXB (in the broken-line frames) arranged in the vicinity of this control line 16, that is, at such a position that a parasitic capacitance is generated between this control line 16 and the pixel electrodes PXB, are hardly affected by the change of the potential of the control line 16.

In this way, in the present embodiment, by using the clock signals CKa and CKb having duty ratios smaller than those of the clock signals CKA and CKB, the potentials of the driving circuit lines other than the control line 16 that supplies the clock signal CKA can be prevented from changing at the OFF-timing of the gate line 13(k).

Figure 24:
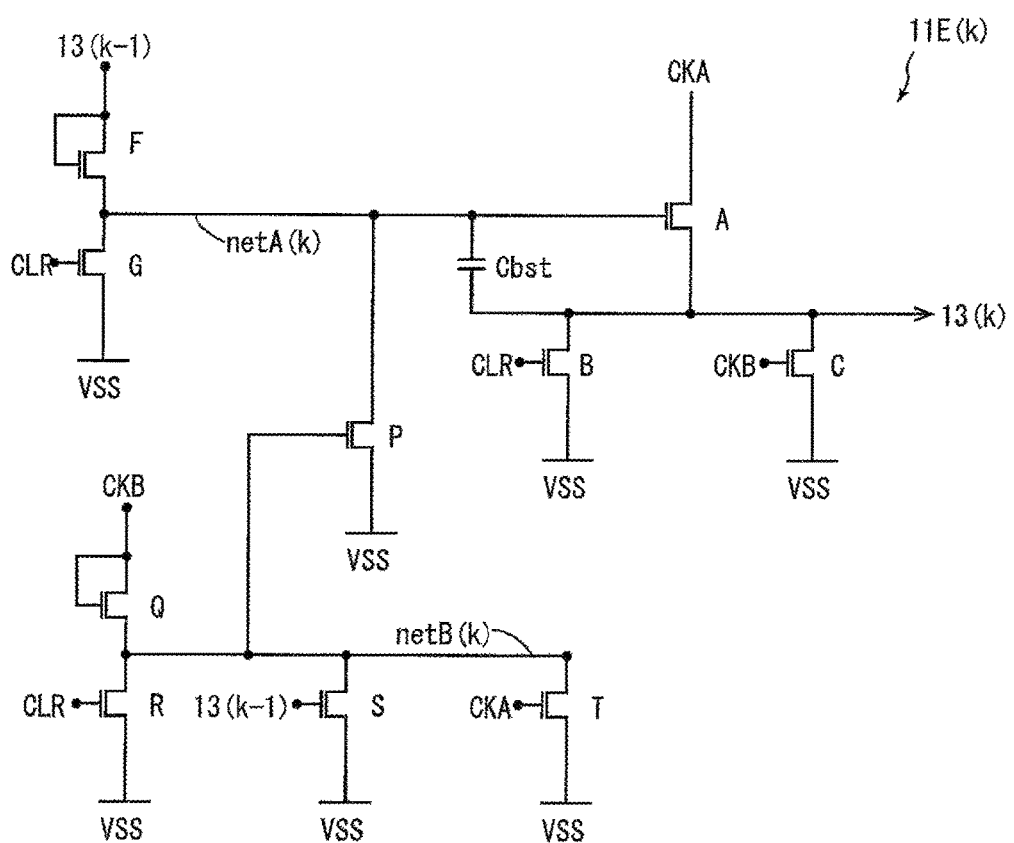
FIG. 24 illustrates an exemplary equivalent circuit of a gate driver in a case where clock signals different from those in the case of FIG. 21 are supplied.

On the other hand, for example, in a case where, in place of the clock signals CKa and CKb, the clock signals CKA and CKB having the same duty ratio are supplied to TFTs-C, -Q, and -T as illustrated in FIG. 24, there is limitation on the arrangement of the driving circuit lines other than the control line 16 that supplies the clock signal CKA.

Figure 25:
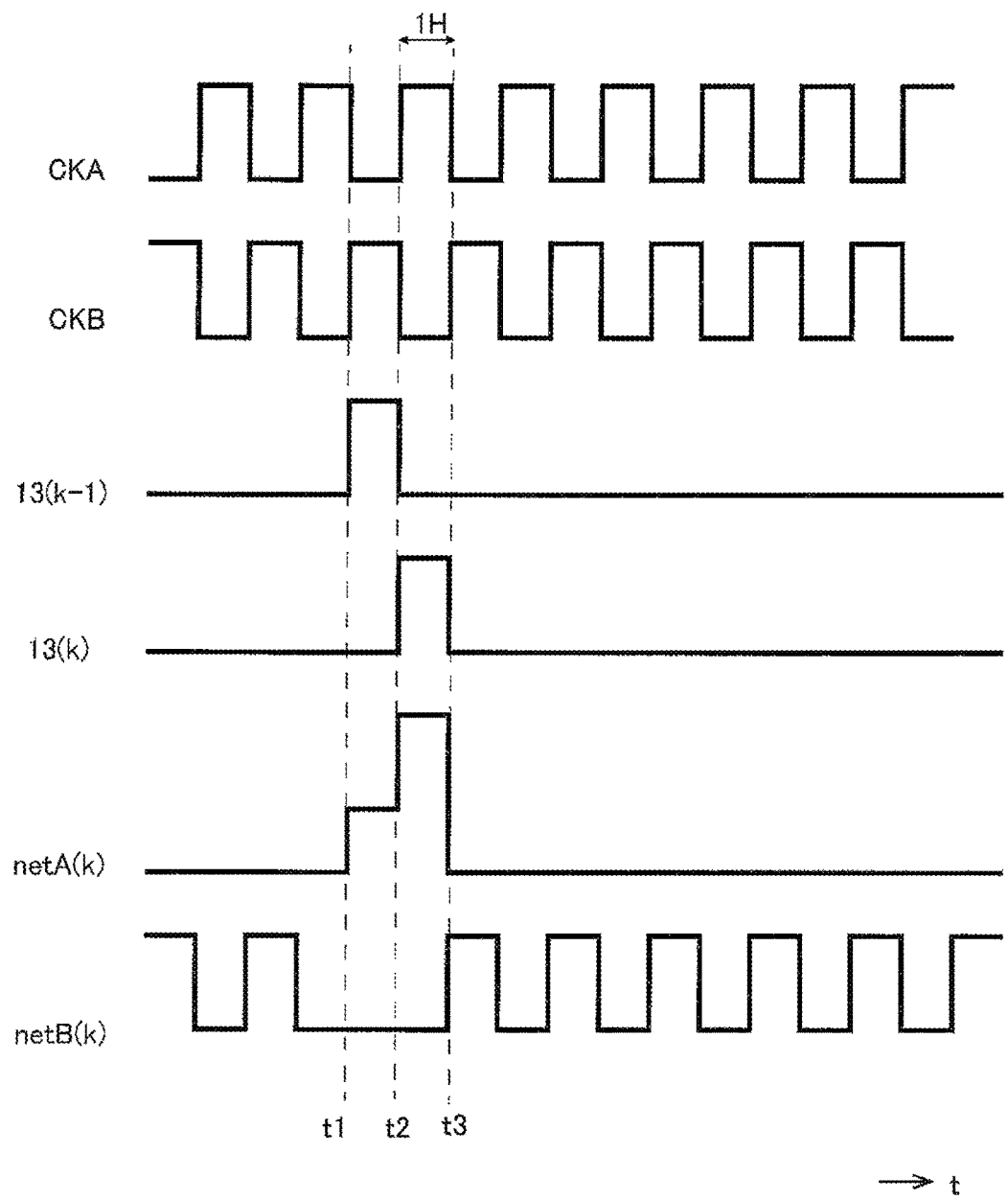
FIG. 25 is a timing chart when the gate driver illustrated in FIG. 24 drives a gate line.

The timing chart in a case where the gate line 13(k) is driven by using the equivalent circuit illustrated in FIG. 24 is represented as in FIG. 25. As illustrated in FIG. 25, in a case where the clock signals CKA and CKB are used, the potentials of the clock signals CKA, CKB, netA(k), and netB(k) change at the OFF-timing of the gate line 13(k).

Figure 26A:
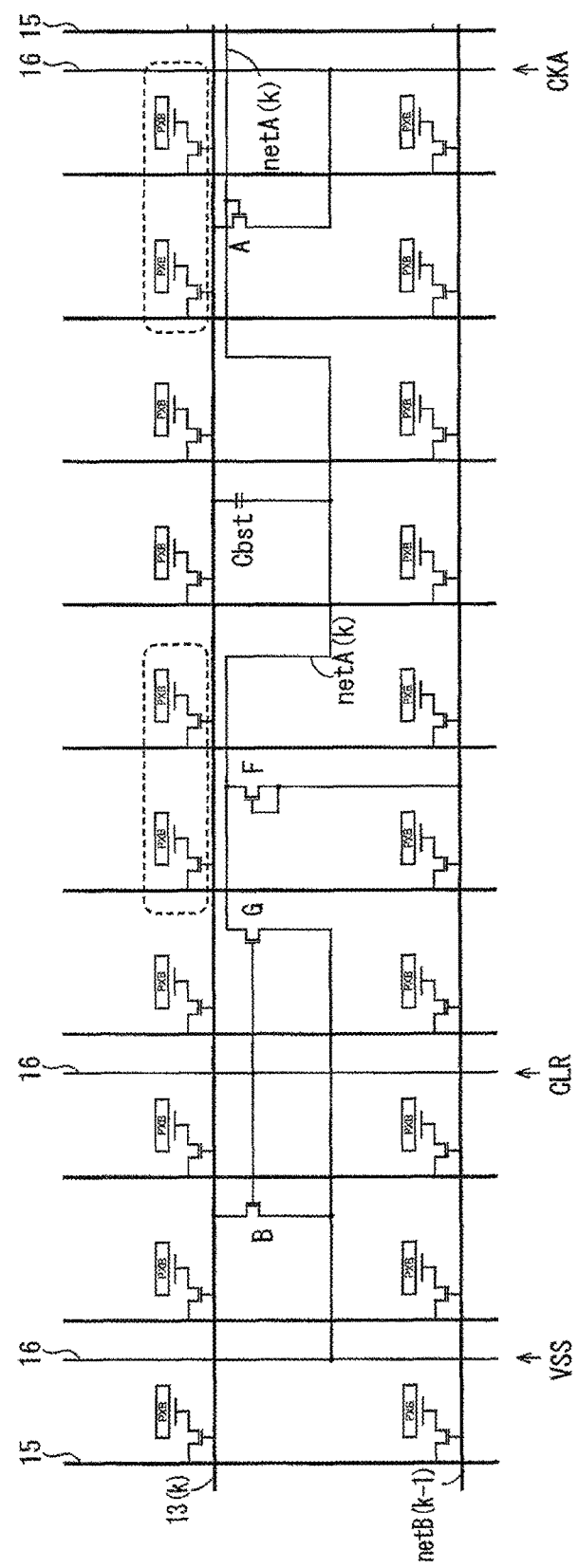
FIG. 26A is a schematic diagram illustrating an exemplary arrangement of the gate driver illustrated in FIG. 24.
Figure 26B:
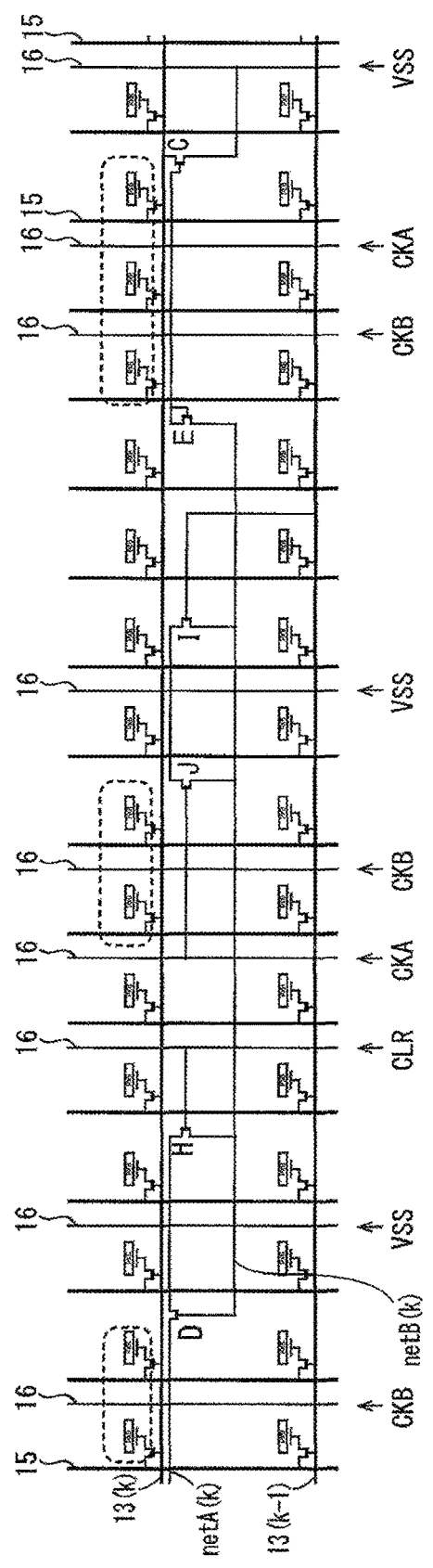
FIG. 26B is a schematic diagram illustrating an exemplary arrangement of the gate driver illustrated in FIG. 24.

FIGS. 26A and 26B are schematic diagrams illustrating an arrangement layout in a case where the respective elements of the gate driver 11E(k) illustrated in FIG. 24 are arranged dispersedly in pixels of one row. As illustrated in FIGS. 26A and 26B, a part of netA(k) and the control lines 16 that supply the clock signals CKA, CKB are arranged in the vicinity of the gate line 13(k). In this case, therefore, the pixel electrodes PXB in the broken-line frames, arranged in the vicinity of these driving circuit lines, are affected by noise caused by the change of the potentials of the driving circuit lines. In other words, in a case where only the clock signals CKA and CKB are used, pixel electrodes PXB affected by noise caused by the change of the potentials of the internal line and the control lines 16 increase, as compared with the case of the present embodiment, which results in that the ratio of occurrence of brightness unevenness increases.

<Embodiment 7>

In Embodiment 6 described above, the clock signals CKa, CKb are used in place of the clock signals CKA, CKB, so that the potential of netA(k) should not change at the OFF-timing of the gate line 13(k). Described as the present embodiment is a configuration in which, in a case where the potential of netA(k) changes at the OFF-timing of the gate line 13(n) (see FIG. 25), even if netA(k) is arranged in the vicinity of the gate line 13(k), the pixel electrodes in the vicinity of netA(k) are hardly affected by the change of the potential of netA(k).

Figure 27A:
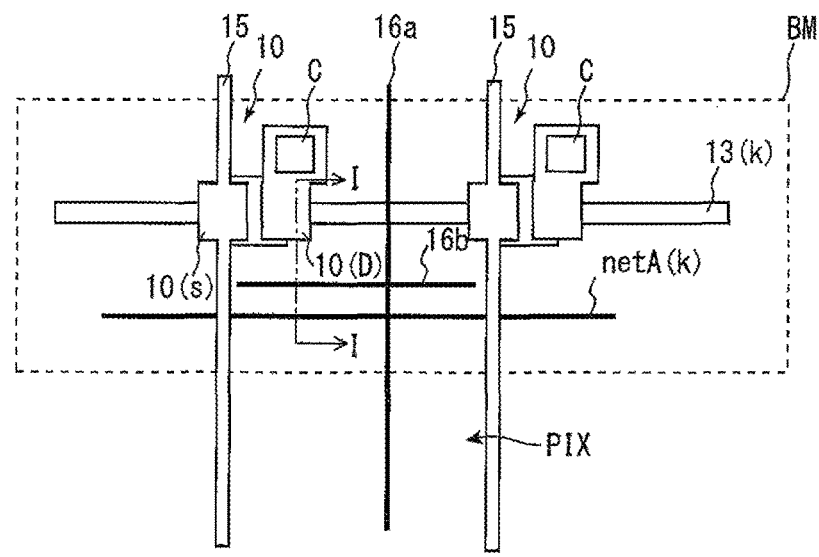
FIG. 27A is a schematic diagram illustrating a pixel in Embodiment 7 where a TFT-F is arranged, in an enlarged state.
Figure 27B:
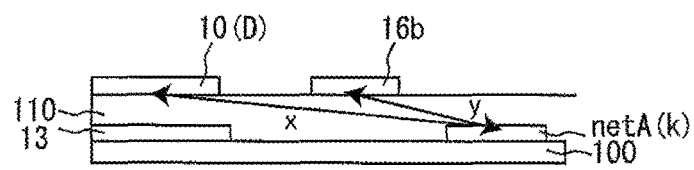
FIG. 27B is a schematic diagram illustrating a cross section of a pixel illustrated in FIG. 27A taken along the line I-I.

FIG. 27A is a schematic diagram illustrating pixels illustrated in FIG. 26A where netA(k) is arranged in the vicinity of the gate line 13(k), in an enlarged state. FIG. 27B is a schematic diagram illustrating a cross section of the pixels illustrated in FIG. 27A taken along the line I-I.

As illustrated in FIG. 27A, in the pixel PIX, there are provided a control line 16a approximately parallel with the source line 15, and a control line 16b that is connected to the control line 16a and is approximately parallel with the gate line 13. The broken-line frame illustrated in FIG. 27A indicates an area where a black matrix (BM) is provided, and the gate line 13(k), the pixel-TFTs 10, the control line 16b, and netA(k) are covered with the black matrix (BM). Though illustration is omitted, each pixel is provided with a pixel electrode PXB, via the drain terminal 10(D) of the pixel-TFT 10 and a contact C.

As illustrated in FIG. 27B, the drain terminal 10(D) of the pixel-TFT 10 and the control line 16b are provided on the gate line 13(k) and netA(k) formed on the substrate 100, with a gate insulating film 110 being interposed therebetween. Further, though illustration is omitted, the control line 16a is also provided in the same layer as the drain terminal 10(D) of the pixel-TFT 10. The control line 16b is provided between netA(k) and the pixel-TFT 10, in the horizontal direction of the substrate 100. The distance y between the control line 16b and netA(k) is shorter than the distance x between netA(k) and the drain terminal 10(D) of the pixel-TFT 10.

Figure 27C:
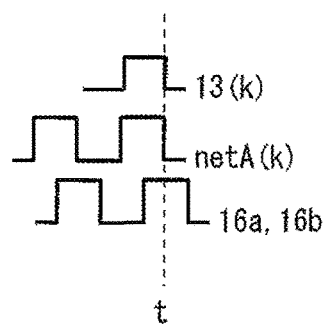
FIG. 27C is a diagram for explaining changes of potentials of the control line, the internal line, and the gate line illustrated in FIG. 27A.

Further, in the present embodiment, as illustrated in FIG. 27C, a potential that does not change at the OFF-timing t of the gate line 13(k) is supplied to the control lines 16a, 16b. This causes the control line 16b to have the same potential as that of the control line 16a. This control signal is a different signal than the clock signals supplied to the gate driver 11E(k); the signal may be a signal that rises/falls to the H level/the low level every certain period (for example, every horizontal scanning period), or may be a signal that has a fixed potential at the H level or the L level. In this way, the control line 16b is arranged between the pixel-TFT 10 and netA(k), whereby noise caused by the change of the potential of netA(k) is reduced by the control line 16b.

In the example described above, a different control signal than the clock signals is supplied to the control lines 16a and 16b, but a clock signal whose potential does not change at the OFF-timing of the gate line 13(k) may be supplied instead. Further, In the example described above, the control line 16b is arranged between netA(k) and the pixel-TFT 10 in the horizontal direction of the substrate 100, but alternatively, the control line 16b may be arranged at a position overlapping netA(k). In short, the control line 16b may be arranged at such a position that the distance y between netA(k) and the control line 16b is smaller than the distance x between the pixel-TFT 10 and netA(k).

The embodiments of the present invention are described above, but the above-described embodiments are merely examples for implementing the present invention. The present invention, therefore, is not limited to the above-described embodiments, and the above-described embodiments can be appropriately varied and implemented without departing from the scope of the invention. The following description describes modification examples of the present invention.

<Modification Example>

Figure 28:
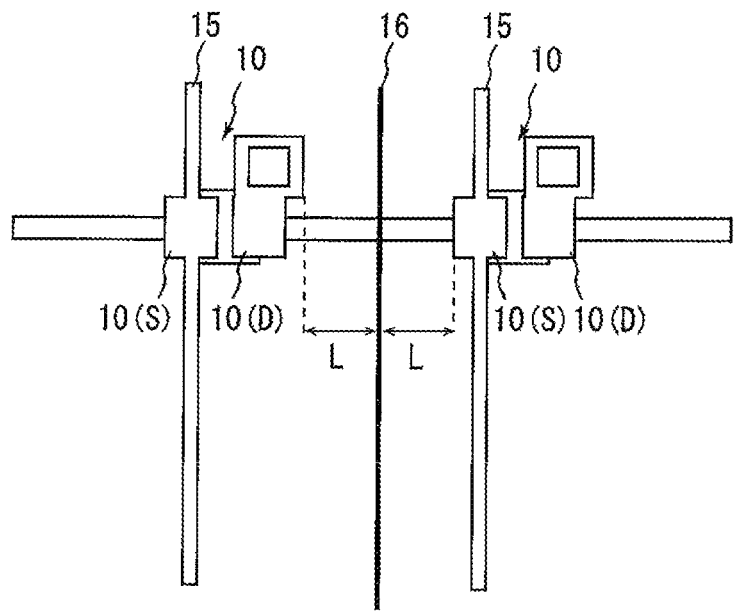
FIG. 28 is a schematic diagram illustrating an exemplary arrangement of control lines in Modification Example 1.

(1) In Embodiments 1 to 7 described above, in a case where a driving circuit line whose potential changes at the OFF-timing of the gate line 13 is provided between the pixel-TFTs 10 that are adjacent in the direction in which the gate lines 13 extend, the driving circuit line may be arranged in the following manner. For example, as illustrated in FIG. 28, the control line 16 whose potential changes at the OFF-timing of the gate line 13 is provided at such a position that distances from the adjacent two pixel-TFTs 10 to the control line 16 are approximately equal to each other. Since the control line 16 is formed in the same layer as the source lines 15, parasitic capacitances tend to be generated between the source terminal 10(S) of one of the pixel-TFTs 10 and the drain terminal 10(D) of the other pixel-TFT 10. The above-described configuration, therefore, makes it possible to reduce parasitic capacitances generated between the control line 16 and the adjacent two pixel-TFTs 10.

Figure 29A:
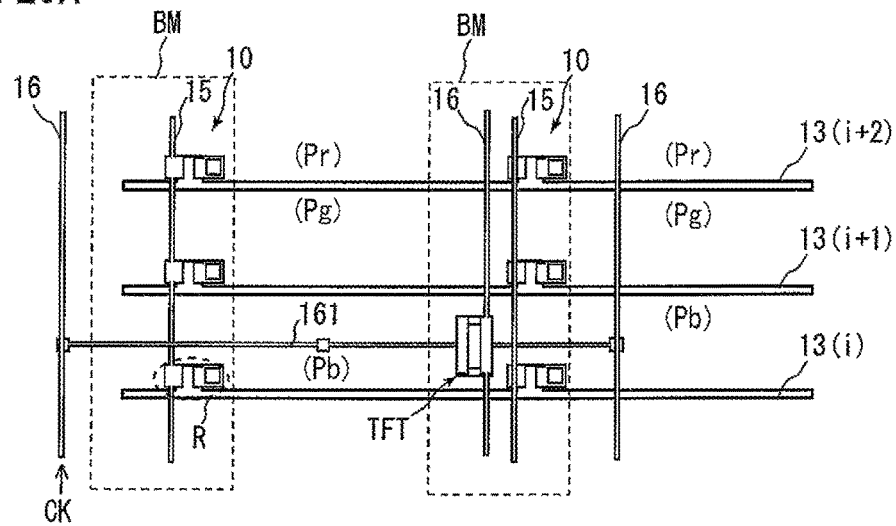
FIG. 29A is a schematic diagram illustrating a part of pixels in Modification Example 2, in an enlarged state.

(2) In Embodiments 1 to 7 described above, pixels corresponding to the respective colors R, G, B of the color filters are arrayed in the direction in which the gate lines 13 extend, in an order of R, G, and B, but the pixels Pr, Pg, and Pb corresponding to the colors R, G, and B, respectively, may be arrayed in the direction in which the source lines 15 extend, as illustrated in FIG. 29A. The required number of the gate lines 13 in this case is three times the number of the gate lines in the embodiments described above, but the required number of the source lines is ⅓ of the number of the source lines in the embodiments described above.

Figure 29B:
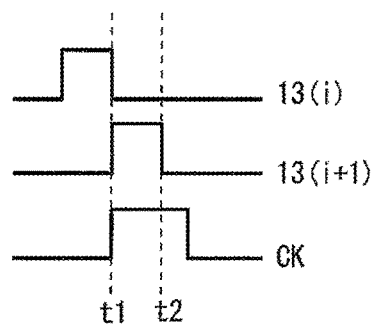
FIG. 29B is a diagram for explaining changes of potentials of the control line and the gate lines illustrated in FIG. 29A.

In FIG. 29A, for example, it is assumed that a control signal CK whose potential changes at the OFF-timing t1 of the gate line 13(i), as illustrated in FIG. 29B, is input to the drain terminal of one of TFTs composing the gate driver. As illustrated in FIG. 29A, in a case where the control line 161 is arranged approximately in parallel with the gate lines 13 from the control line 16 to the row where a TFT are arranged, is connected to the TFT, a parasitic capacitance is generated between the pixel-TFT 10 indicated by a broken-line frame R and the control line 161. As a result, a pixel electrode (not shown) connected to the pixel-TFT 10 indicated by the broken-line frame R is affected by noise caused by a change of the potential of the control signal CK.

Figure 29C:
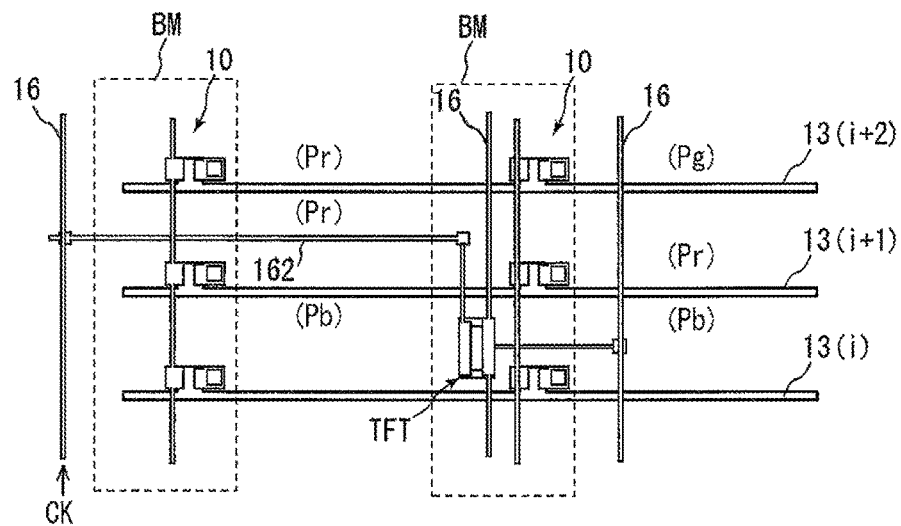
FIG. 29C is a schematic diagram illustrating an exemplary arrangement of the control lines in Modification Example 2.

In the present modification example, as illustrated in FIG. 29C, regarding the control lines 16, a control line 162 that is arranged along the row between the gate lines 13(i+1) and 13(i) is connected with TFT. It should be noted that, as illustrated in FIG. 29B, at the OFF-timing t2 of the gate line 13(i+1), the potential of the control line 162 does not change. A pixel electrode (not shown) connected to the pixel-TFT 10 arranged in the vicinity of the control line 162 is not affected by noise caused by the change of the potential of the control line 162.

INDUSTRIAL APPLICABILITY

The present invention is applicable to a display device such as a liquid crystal display.

The invention claimed is:

1. An active matrix substrate having a pixel region that has a plurality of pixels formed in matrix by a plurality of gate lines and a plurality of source lines, the active matrix substrate comprising, in each pixel, a pixel-switching element connected with one gate line and one source line in the pixel, and a pixel electrode connected to the pixel-switching element, the active matrix substrate further comprising:
  a driving circuit that is arranged in the pixel region, and switches one of the gate lines corresponding thereto to a selected state or a non-selected state, according to a control signal supplied thereto; and
  a plurality of control lines that are arranged in the pixel region, are connected with the driving circuit, and supply the control signal to the driving circuit,
  wherein the driving circuit includes a plurality of switching elements and an internal line, and
  among the control lines connected with the driving circuit, and the internal line in the driving circuit, a first line that is at least a part of the lines arranged in the vicinity of the pixel-switching element has a potential that varies among a plurality of voltage levels, and the potential does not change while the gate line connected with the pixel-switching element shifts from the selected state to the non-selected state.

2. The active matrix substrate according to claim 1, wherein control signals for switching the gate line to the selected state during a predetermined period are supplied to the control lines, respectively, wherein the control signals have phases different from one another, and potentials of the control signals change to a first voltage level, or to a second voltage level that is lower than the first voltage level, and
to the first line, a control signal whose potential does not change while the gate line shifts from the selected state to the non-selected state is supplied.

3. The active matrix substrate according to claim 1, wherein potentials of the lines other than the first line, among the control lines connected with the driving circuit, and the internal line in the driving circuit, change while one gate line corresponding to the driving circuit shifts from the selected state to the non-selected state,
the first line is arranged in the vicinity of the pixel-switching element connected to the one gate line, and
a second line that is at least a part of the lines other than the first line is arranged in a pixel in a row adjacent to the pixel where the first line is arranged.

4. The active matrix substrate according to claim 1, wherein potentials of the lines other than the first line, among the control lines connected with the driving circuit, and the internal line in the driving circuit, change while one gate line corresponding to the driving circuit shifts from the selected state to the non-selected state, and
a second line that is at least a part of the lines other than the first line is arranged at a position that is approximately a midpoint between a drain electrode of the one pixel-switching element connected to the one gate line, and a source electrode of a pixel-switching element adjacent to the foregoing pixel-switching element in a direction in which the gate line extends, so as to be approximately parallel to the source line.

5. The active matrix substrate according to claim 1, wherein potentials of the lines other than the first line, among the control lines connected with the driving circuit, and the internal line, change while the one gate line corresponding to the driving circuit shifts from the selected state to the non-selected state,
the second line that is at least a part of the lines other than the first line is arranged approximately in parallel with the one gate line in the vicinity of the one gate line,
the at least one first line is arranged approximately in parallel with the one gate line, either between the one gate line and the one second line, or at a position overlapping the one second line, and
a distance between the one second line and the one first line is smaller than a distance between the pixel-switching element connected to the one gate line and the one first line.

6. The active matrix substrate according to claim 1, wherein each pixel corresponds to any color among red (R), green (G), and blue (B), and
the pixels are arrayed in such a manner that the pixel corresponding to red (R), the pixel corresponding to green (G), and the pixel corresponding to blue (B) are arrayed along the source lines.

7. A display device comprising:
the active matrix substrate according to claim 1;
a counter substrate including a color filter; and
a liquid crystal layer interposed between the active matrix substrate and the counter substrate.

* * * * *